US006998174B2

(12) United States Patent
Porter et al.

(10) Patent No.: US 6,998,174 B2
(45) Date of Patent: Feb. 14, 2006

(54) INTEGRATED CO-INJECTION MOLDED VEHICLE COMPONENTS AND METHODS OF MAKING THE SAME

(75) Inventors: Marshall Ray Porter, Oakdale, IL (US); Norman E. Guschewski, Grosse Ile, MI (US); Michael B. Smith, Smithton, IL (US); Keith Korte, Damiansville, IL (US); Todd C. Parker, Nashville, IL (US); Russell R. York, Hoyelton, IL (US)

(73) Assignee: Conix Corporation, Dearborn, MI (US)

( * ) Notice: Subject to any disclaimer, the term of this patent is extended or adjusted under 35 U.S.C. 154(b) by 0 days.

(21) Appl. No.: 10/204,734

(22) PCT Filed: Feb. 23, 2001

(86) PCT No.: PCT/US01/05849

§ 371 (c)(1),
(2), (4) Date: Dec. 10, 2002

(87) PCT Pub. No.: WO01/62488

PCT Pub. Date: Aug. 30, 2001

(65) Prior Publication Data

US 2003/0211311 A1 Nov. 13, 2003

Related U.S. Application Data

(60) Provisional application No. 60/264,916, filed on Jan. 29, 2001, provisional application No. 60/184,743, filed on Feb. 24, 2000, provisional application No. 60/184,639, filed on Feb. 24, 2000, provisional application No. 60/184,564, filed on Feb. 24, 2000.

(51) Int. Cl.
*B32B 5/20* (2006.01)
*B60R 19/03* (2006.01)

(52) U.S. Cl. .............................. 428/318.8; 428/319.3; 428/319.7; 428/68; 428/71; 428/76; 293/120; 293/121; 293/122; 362/546; 362/549

(58) Field of Classification Search ............. 428/304.4, 428/318.8, 319.3, 319.7, 68, 71, 76; 293/120, 293/121, 122; 362/546, 549
See application file for complete search history.

(56) References Cited

U.S. PATENT DOCUMENTS 3,873,656 A 3/1975 Garner et al.

(Continued)

FOREIGN PATENT DOCUMENTS

DE 19703291 3/1998

(Continued)

OTHER PUBLICATIONS

Rusch K.C., Gas Assisted Injection Molding—The New Thermoplastic Molding Technology for Exterior Body panels Plastics in Automobiles. Bumper Systems, Interior Trim, Instrument Panels, and Exterior Panels. Detroit Feb. 27-Mar. 3, 1989, International Congress and Exposition, Warrendale, SAE, US, pp. 155-162.

(Continued)

*Primary Examiner*—Hai Vo
(74) *Attorney, Agent, or Firm*—Banner & Witcoff, Ltd.

(57) ABSTRACT

A vehicle bumper (20) integrates rigid and flexible components into a single co-injection molded structure. In a preferred embodiment, a flexible fascia (58) is provided with integrated rigid fastener brackets (62, 66, 70, 71), energy absorption structure and head lamp brackets and housings (62). A method for manufacturing such a bumper provides for the injection of two different plastic materials during the same molding process. The flexible plastic material first injected into the mold. Then, the rigid plastic material is injected at gates located where the rigid material is desired. In one embodiment, the rigid material is completely contained within the flexible material. The rigid material may be either a higher stiffness plastic or a fiber reinforced plastic.

19 Claims, 22 Drawing Sheets

U.S. PATENT DOCUMENTS

| | | |
|---|---|---|
| 4,025,686 A | 5/1977 | Zion |
| 4,722,033 A * | 1/1988 | VanDuyn et al. ............ 362/528 |
| 4,837,251 A * | 6/1989 | Okey et al. .................. 523/218 |
| 5,017,629 A * | 5/1991 | Wilson et al. ............... 523/219 |
| 5,066,057 A * | 11/1991 | Furuta et al. ................ 293/121 |
| 5,169,648 A | 12/1992 | Eckardt et al. |
| 5,277,462 A | 1/1994 | Verzelli |
| 5,387,391 A | 2/1995 | Satoh et al. |
| 5,637,328 A | 6/1997 | Shah et al. |
| 5,855,840 A | 1/1999 | Cucheran et al. |
| 5,967,592 A * | 10/1999 | Freeman ..................... 293/120 |
| 6,068,424 A | 5/2000 | Wycech |
| 2003/0211307 A1 * | 11/2003 | Porter |

FOREIGN PATENT DOCUMENTS

| | | |
|---|---|---|
| EP | 0 6285911 | 10/1994 |
| EP | 0 688 652 | 12/1995 |
| EP | 0 773 096 | 5/1997 |
| EP | 0 949 053 | 10/1999 |
| GB | 2 087 299 | 5/1982 |
| JP | 58 042441 | 3/1983 |
| JP | 04 293638 | 10/1992 |
| JP | 5-57741 | 3/1993 |
| JP | 06 312437 | 11/1994 |
| JP | 10 15981 | 1/1998 |
| WO | WO 98/24610 | 6/1998 |
| WO | WO 98/34771 | 8/1998 |
| WO | WO 98/39150 | 9/1998 |
| WO | WO 01/12411 | 2/2001 |

OTHER PUBLICATIONS

McIntyre, J.E., Reinforcing Fibres (pp. 544-558).

United States News From Antec; researchers Announce Latest Advances in Nanocomposites; Jun., 1999, p. 41.

* cited by examiner

PRIOR ART - REAR BUMPER

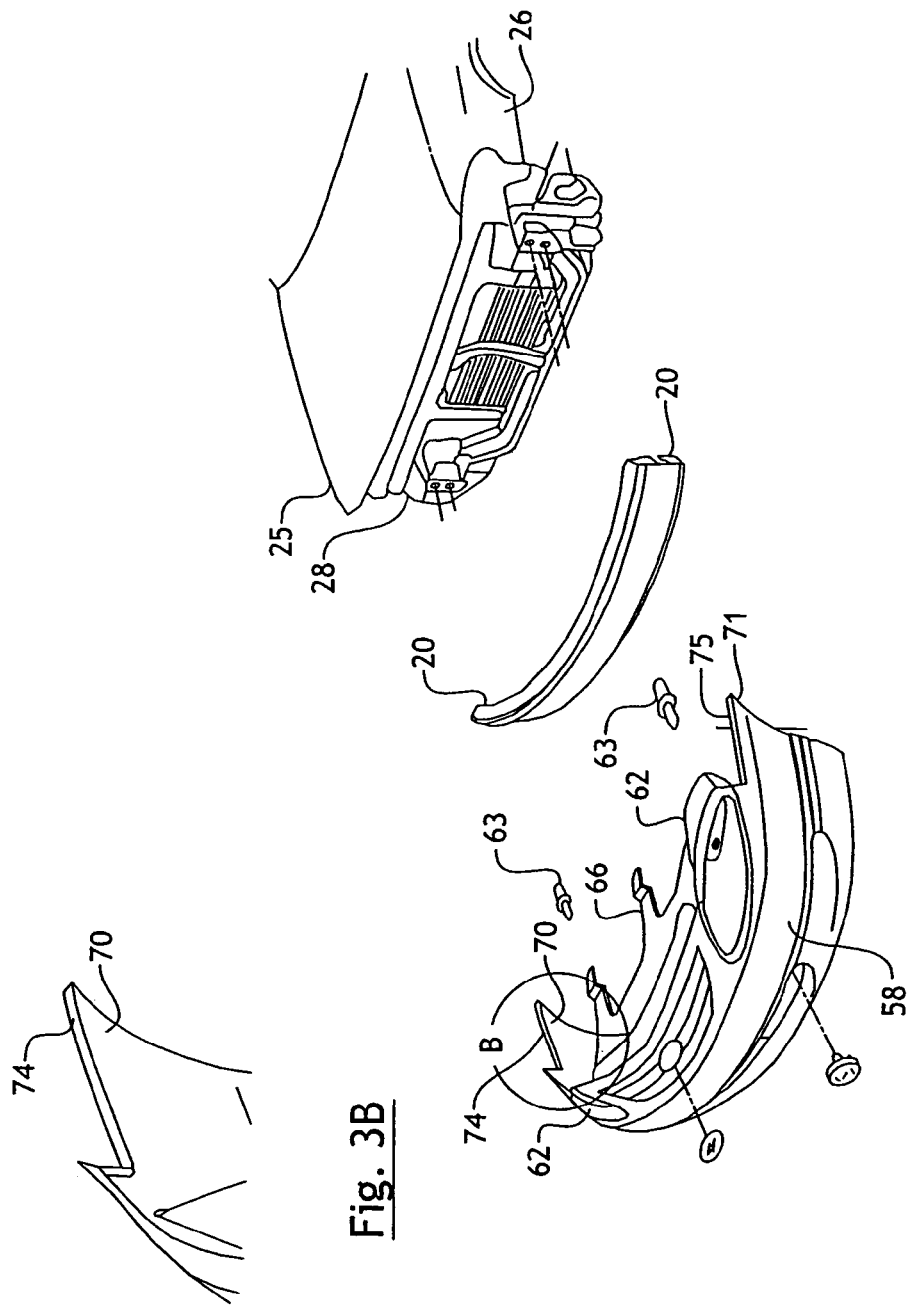

INTEGRATED REAR BUMPER

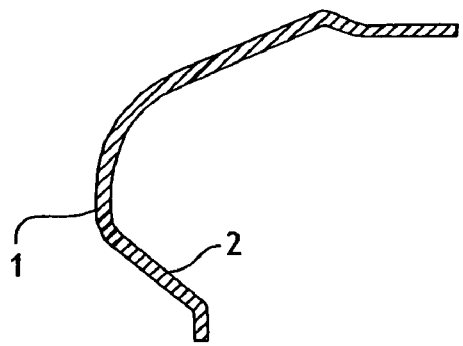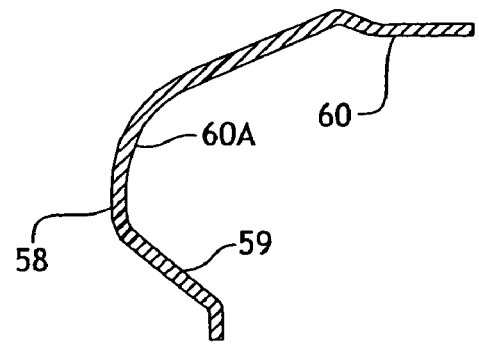
(PRIOR ART)
Fig. 4A
Fig. 4B
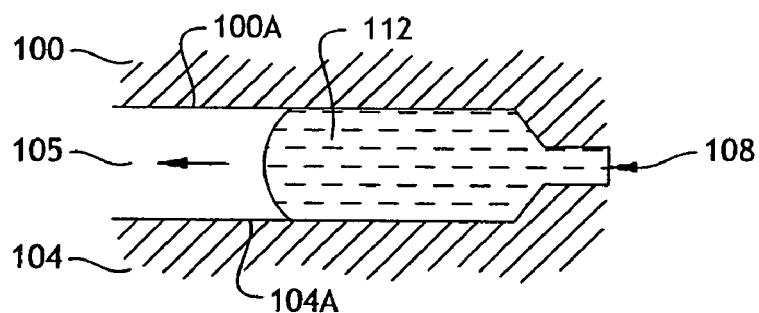
Fig. 5A
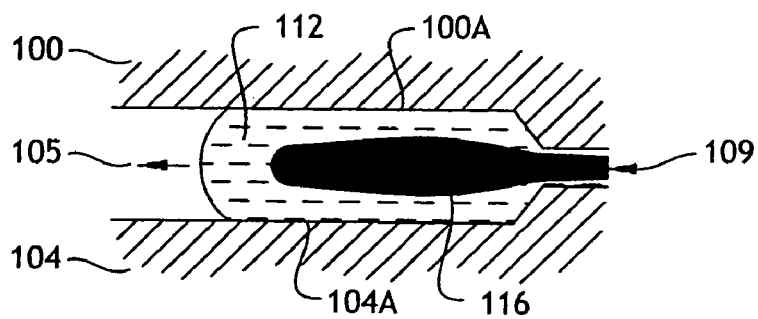
Fig. 5B

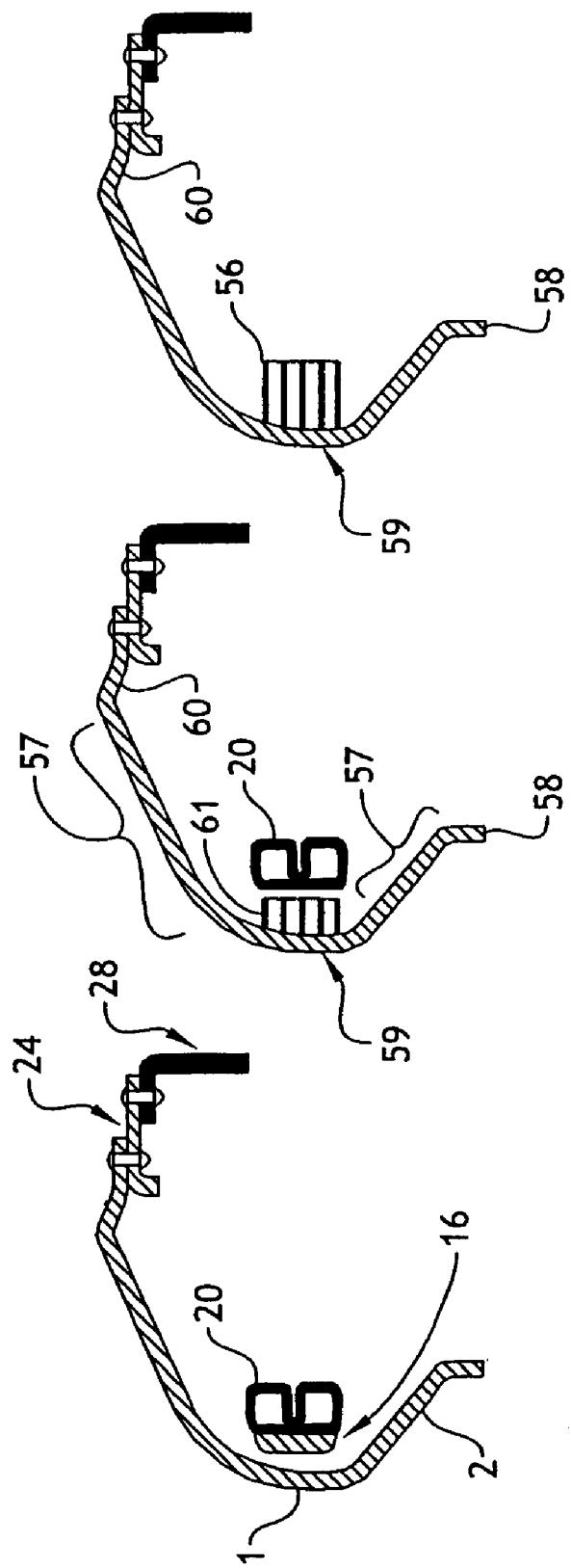

OVER FLOW JUST PRIOR TO INJECTION OF FLUID

INTEGRATED CO-INJECTION MOLDED VEHICLE COMPONENTS AND METHODS OF MAKING THE SAME

RELATED APPLICATIONS

Priority is claimed to provisional application Ser. Nos. 60/184,743, entitled "Injection Molding Techniques Utilizing Fluid Channels," 60/184,639, entitled "Integrated Co-Injection Molded Bumpers and Methods of Making the Same," and 60/184,564, entitled "Low-Density Injection-Molded Body Parts," which were all filed on Feb. 24, 2000, and Ser. No. 60/264,916, entitled "Multi-Part Sequential Valve Gating," which was filed Jan. 29, 2001.

FIELD OF THE INVENTION

The present invention relates generally to vehicle components, such as vehicle bumpers, and methods for manufacturing the same. More particularly, the invention relates to co-injection molded vehicle components, such as vehicle bumpers, which have integrated flexible and rigid structures. The invention also relates to method for manufacturing such vehicle components.

BACKGROUND OF THE INVENTION

Vehicle bumpers incorporate flexible components and rigid components in their construction. The flexible components of a conventional bumper include, for example, the bumper fascia (or cover) and air dam. The fascia fits around the head lamps and may include the grille area up to the hood or trunk lid. The rigid components of a conventional bumper include, for example, the radiator opening reinforcement, fender attachment brackets, and head lamp brackets, which are made from stamped steel or compression molded glass fiber reinforced plastic. In addition, conventional bumpers incorporate an energy absorption structure, which is a relatively rigid structure that may be in the form of a steel bumper beam extending across the bumper for absorbing massive impact energy according to Federal Motor Vehicle Safety Standards (FMVSS). In the prior art, the flexible bumper components are typically molded separately and then assembled manually or robotically to the rigid components with the expenditure of considerable effort and cost.

Thus, known bumpers and methods for manufacturing them are characterized by relatively high production costs because of the effort required to assemble the flexible and rigid components together. Accordingly, it would be advantageous to provide vehicle bumpers and methods for manufacturing them which address these problems.

SUMMARY OF THE INVENTION

The aforementioned desired advantages are realized by the present invention, which provides vehicle components that utilize a co-injected molded structure for integrating the flexible and rigid components. Vehicle components that can be made in accordance with the present invention include, but are not limited to, bumpers, fascia, door panels, fenders, quarter panels, running boards, hoods, and trunk lids. Thus, while the following description is directed to the manufacture of a flexible bumper fascia, the same techniques described herein can be used to make a wide variety of components. In a preferred embodiment, the invention provides rigid support brackets for attaching the fascia to fenders and the radiator opening reinforcement structure, the rigid brackets being integrated into the flexible bumper fascia. Additionally, the invention provides rigid lamp support structure and lamp housings that are integrated into the flexible bumper fascia. Still further, the invention provides for the rigid energy absorption structure to be integrated into the flexible bumper fascia. These integral rigid structures are molded integrally with the flexible bumper fascia without any visible distinctions, such as sink marks, on the exposed surface of the bumper fascia.

The co-injection molding method according to the invention permits the injection of two different plastic materials in a single molding operation. The flexible component(s) or portion(s), such as the fascia, of the bumper is molded first, by injecting a first plastic material into a mold. Then, at a time when the flexible plastic material near the mold wall has cooled, but the central portion of the flexible plastic material in the mold remains molten, the rigid component(s) or portions are formed by injecting a second plastic material into the mold through gates located where the rigid material is desired. The rigid plastic material displaces the molten flexible plastic material and the rigid material becomes encased in the flexible plastic material. The rigid material is preferably completely contained within the plastic material. The rigid plastic material may be a plastic material with a higher stiffness than the flexible plastic material, and/or may include reinforcing fibers, such as glass and/or carbon fibers, or reinforcing particles, such as nanoparticles (for example, nanoparticles comprising smectite clay), for increasing the structural strength of the rigid component(s) or portion(s). The resin can be any suitable resin, including but not limited to polypropylene, polyethylene, and/or acrylonitrile butadiene styrene (ABS).

The invention permits multiple bumper pieces to be molded into a single unitary piece or section. Thus, attachment portions or bosses may be molded into the bumper without visible sink areas on the exposed bumper surface. Moreover, stiffening ribs may be added to the bumper for increased stiffness and compliance with safety standards. Still further, rigid material can be provided to certain specified areas of the bumper and other areas can be made with the flexible material as desired for bumper flexing upon impact.

The present invention provides processes and an apparatus for injection-molding an article with a fluid channel formed therein to provide strength and structural integrity. The process includes providing a mold defining a mold cavity for a part or article, providing at least first and second resin streams within the mold cavity wherein each resin stream has a flow front, causing the flow fronts of the resin streams to meet at a longitudinal point in the mold cavity to form a first layer of solidified resin on a peripheral surface of the mold, the first layer having a knit line where the resin streams meet; and introducing a fluid into the molten resin in the mold to form a fluid channel and a second layer of solidified resin, the second layer between the fluid channel and the first layer, wherein the second layer is devoid of a knit line at the longitudinal point of the knit line in the first layer. Where desired, the fluid may be introduced and the resin may be retained within the mold, or a portion of the resin can overflow outside of the mold.

The fluid channel formed in accordance with the present invention may have a cross-section that is generally circular in shape and may extend substantially through multiple portions of the molded article. In accordance with the present invention, orientation of reinforcing fibers in the second layer of solidified resin may be in a direction that is generally transverse to the knit line in the first solidified resin layer. Further, the reinforcing fibers in the second layer of solidified resin can extend across the longitudinal point where the flow fronts meet. The formation of the second layer of solidified resin that is devoid of knit lines at the longitudinal point of the knit lines in the first layer of solidified resin results in increased enhanced structural integrity of the molded article. Further, the present invention can be used to make structural reinforcement articles, such as reinforcement members for vehicles, that could not be practically manufactured using conventional injection molding techniques.

In a preferred embodiment, a molding apparatus according to the invention includes a mold defining a mold cavity for a part or article, and at least one gate for introducing molten resin into the mold cavity. In a preferred embodiment, multiple gates can be used to introduce molten resin into the mold cavity. The mold is also provided with means for introducing a fluid, such as a compressed gas (for example, air or nitrogen) or a pressurized liquid (for example, water), into the mold cavity at an appropriate place and time. The fluid comprises a different material than the resin. Preferably, the fluid is introduced at a time when the resin that is immediately adjacent the mold cavity has begun to solidify into a first layer of solidified resin due to the cooling provided by the mold surface. The first layer of solidified resin is between the mold surface and resin near the center of the mold cavity that is still in a molten state. As a result, injection of the fluid into the mold cavity results in the displacement of the molten resin near the center of the mold cavity and the formation of a fluid channel.

Displacement of the molten resin also results in a reorientation of reinforcing fibers in the molten resin in the vicinity of the knit lines in the first layer of solidified resin, such that when that molten resin solidifies to form a second layer of solidified resin devoid of a knit line, fibers in the second layer are oriented transverse to the knit lines in the first layer. The displaced molten resin can be used to fill unfilled portions of the mold cavity to form first and second layers therein (a process that can be referred to as a "short shot" or "packing out" method) and/or the displaced resin can be displaced to an overflow chamber (a process that can be referred to as an "overflow" method). Injection of fluid may occur through nozzles in fluid communication with the mold cavity and similar to those utilized for conventional gas-assisted molding techniques.

In one of its broadest applications, the invention provides an apparatus for injection molding articles comprising a mold including at least a gate for the introduction of molten resin including reinforcing fibers, the resin traveling within the mold defining at least two flow fronts, the flow fronts meeting to form a knit line at a longitudinal point in a first layer of solidified resin, the first layer on the peripheral surface of the part being formed, and further including means for injecting a fluid into the resin within the mold to form a fluid channel in the molded article, and a second layer of solidified resin between the fluid channel and the first layer of solidified resin, the second layer devoid of a knit line at the longitudinal point of the knit line in the first layer. Preferably, reinforcing fibers in the second layer may be orientated in a direction that is substantially transverse to the knit line.

In another of its broadest applications, the invention also provides a process for injection molding articles, the process comprising the steps of: a) providing a mold defining a mold cavity; b) providing first and second resin streams within the mold cavity, each resin stream having a flow front; c) causing the flow fronts of the resin streams to meet to form a knit line at a longitudinal point in a first layer of solidified resin; and d) introducing a fluid into the resin in the mold, and e) forming a fluid channel and a second layer of solidified resin, the second layer between the fluid channel and the first layer, the second layer devoid of a knit line at the longitudinal point of the first layer.

Co-injection of two or more different molten resins can also be used in accordance with the present invention to form different first and/or second solidified resin layers at different portions of a part as may be desired. More specifically, co-injection of two or more different molten resins can be performed at the same or different gate locations and/or a different times as may be desired.

A primary advantage provided by the invention is increased strength of molded articles, especially at the longitudinal point of knit lines, by forming a second layer devoid of a knit line at that longitudinal point of knit lines in the first layer. Thus, articles molded according to the invention will typically have greater strength and structural integrity than articles molded according to conventional techniques. Moreover, articles that require increased strength and structural integrity, such as structural polymeric articles for vehicles, may formed in accordance with the present invention that could mot be made using conventional injection molding techniques.

The present invention provides a method and system for sequential multi-cavity co-injection for controlling melt fronts of a plurality of different polymer materials sequentially and independently from one another using a hot runner manifold system. In one embodiment, the method includes the steps of independently sequencing inputs for a plurality of molten materials by utilizing predetermined starting and ending injection times for each of a plurality of gate locations; monitoring screw positions on injection units separately for each molten material; providing, by the communication devices, monitoring information to the microprocessor or controller; communicating, by the microprocessor or controller, preselected inputs for starting and ending injection times to an intermediate communication device, to provide a plurality of output communications to the mold communication device; and communicating each of the output communications to gates independently for each melted material through associated independent inlets on a mold to manufacture at least one component.

The multi-cavity sequential valve gating system and method may be implemented to mold non-identical components or identical components. The system and method may be implemented using dual injection with at least two different molten materials, or co-injection in coordination with dual injection. Where desired, dynamic feed control may be used to input the selected molten materials.

The present invention provides a co-injection molded, multiphase vehicle component with a microsphere enhanced region wherein the component incorporates microspheres with the core material to reduce the density of the core, reduce the weight of the component and lower the cost by displacing a more expensive core material, while maintaining the surface appearance and strength of the component. In addition, it reduces shrinkage in thick sections to eliminate sinks in appearance areas. The present invention further provides a method for manufacturing such a component.

The present invention provides a co-injection molded, multiphase vehicle component with a microsphere enhanced region that has an outer portion or phase (also known as a "skin") formed by injection of a preselected quantity of a desired thermoplastic material into a preselected mold in a manner to achieve a first layer of the thermoplastic material in a cavity of the mold. The component also includes a microsphere enhanced inner portion or phase formed by injection of a microsphere enhanced core material to fill a remaining portion of the cavity. The microspheres are used to displace a more expensive core filling material, thus also providing a less dense core, reducing the weight of the component while maintaining its strength. The microspheres utilized may be substantially hollow, substantially solid, or a mixture of both. Clearly, using substantially hollow microspheres material results in a component with a less dense core and a minimized weight.

BRIEF DESCRIPTION OF THE DRAWINGS

The accompanying drawings which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings, in which like numbers refer to like parts throughout:

FIG. 3A is a isometric view of a front vehicle bumper according to a preferred embodiment of the present invention;

FIG. 3B is a partial isometric of an enlarged portion of FIG. 3 showing section "B";

FIG. 4A is an orthogonal cross-section of a prior art fascia;

FIG. 4B is a cross-section of a fascia according to a preferred embodiment of the present invention;

FIGS. 5A and 5B show a co-injection molding method according to a preferred embodiment of the present invention;

FIG. 6 is a cross-section showing the components of a prior art front vehicle bumper;

FIG. 7 is a cross-section showing a fascia and integrated radiator support structure bracket and energy absorption structure foam cap according to a preferred embodiment of the invention;

FIG. 8 is a cross-section showing a fascia and integrated radiator support structure bracket, energy absorption structure foam cap and energy absorption structure bumper beam according to another preferred embodiment of the invention;

DESCRIPTION OF THE PREFERRED EMBODIMENTS

Figure 1:
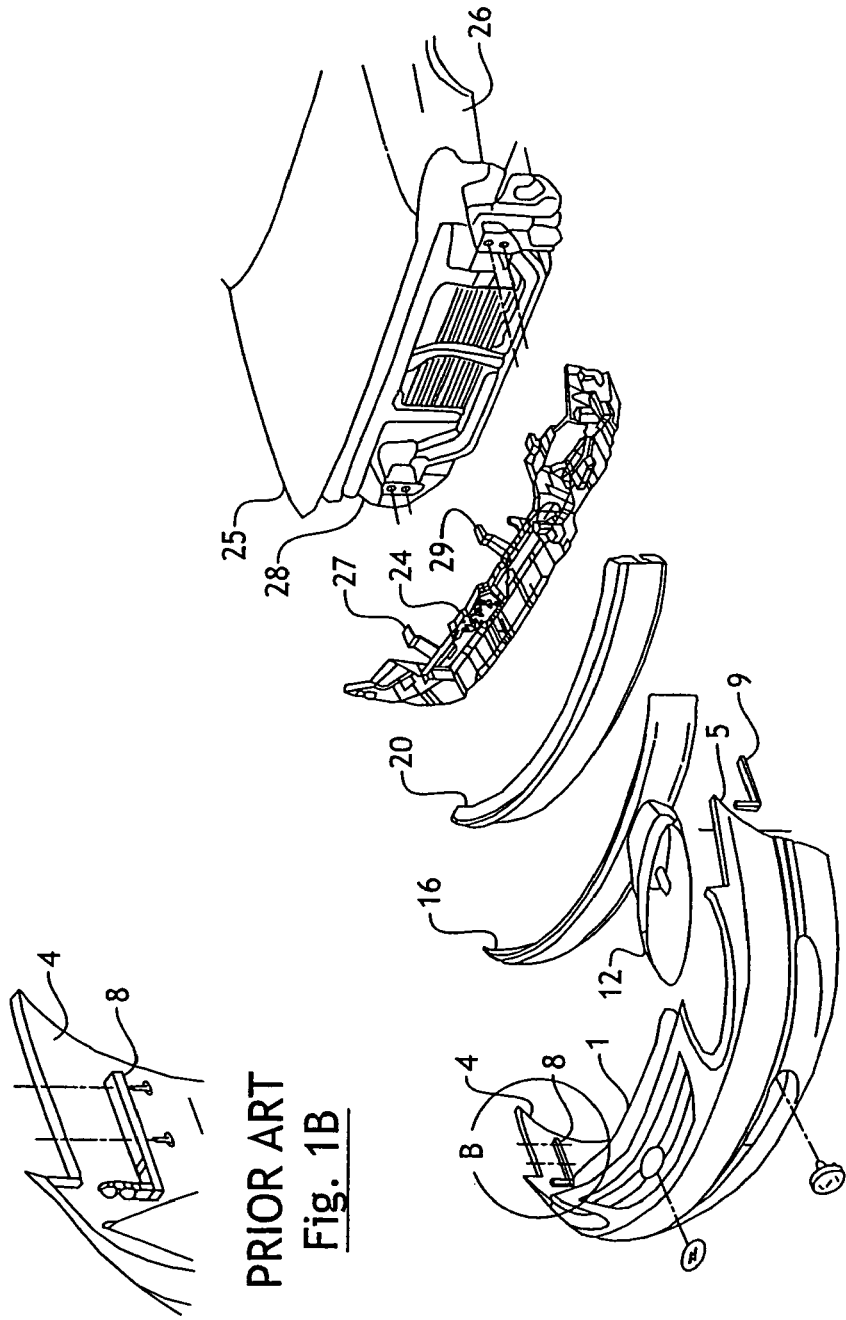
FIG. 1A is an isometric view of a prior art front vehicle bumper.
FIG. 1B is a partial isometric view of an enlarged area "A" of FIG. 1 showing a fender attachment bracket of a prior art front vehicle bumper.

FIG. 1A depicts an exploded view of a prior art front vehicle bumper. The bumper has flexible components and rigid components. The flexible components include the fascia 1 which covers the other components in an aesthetically pleasing manner. The rigid components include the radiator opening support 24, which attaches to the primary body structure 28, fender attachment brackets 8 and 9, which attach the fascia 1 to the radiator opening support 24 and head lamp housing 12. An energy absorption structure is formed by a rigid bumper beam 20 and foam cap 16 which are disposed between the fascia 1 and the primary body structure 28.

During assembly, the radiator opening support 24 is attached to the primary body structure 28. The bumper beam 20 is attached to body structure 28, foam cap covering 16 is attached to bumper beam 20, and the headlight lamp holder 12 is then attached to the radiator opening support 24. Finally, the flexible fascia 1 is attached to the radiator opening support 24 at fascia supports 27 and 29 to complete the bumper system through fender attachment brackets 8 and 9. The fender attachment brackets 8 and 9 are located on the upper inside portions 4 and 5 of the fascia 1 and are attached to the corresponding fascia connection points 25 and 26 on the body structure 28.

FIG. 1B depicts an enlarged view of section "A" of the fascia 1 shown in FIG. 1A. The fender attachment bracket 8 is located in the upper and inside portion 4 of the fascia 1. The fender attachment bracket 8 functions as a connection to connect the fascia 1 to connection point 25 of the body structure 28 (shown in FIG. 1). Fender attachment 8 also functions as a support to the fascia 1 in place on the vehicle. An identical fender attachment bracket 9 (shown in FIG. 1A) connects the fascia 1 to the connection point 26 on the opposite side of body structure 28.

Figure 2:
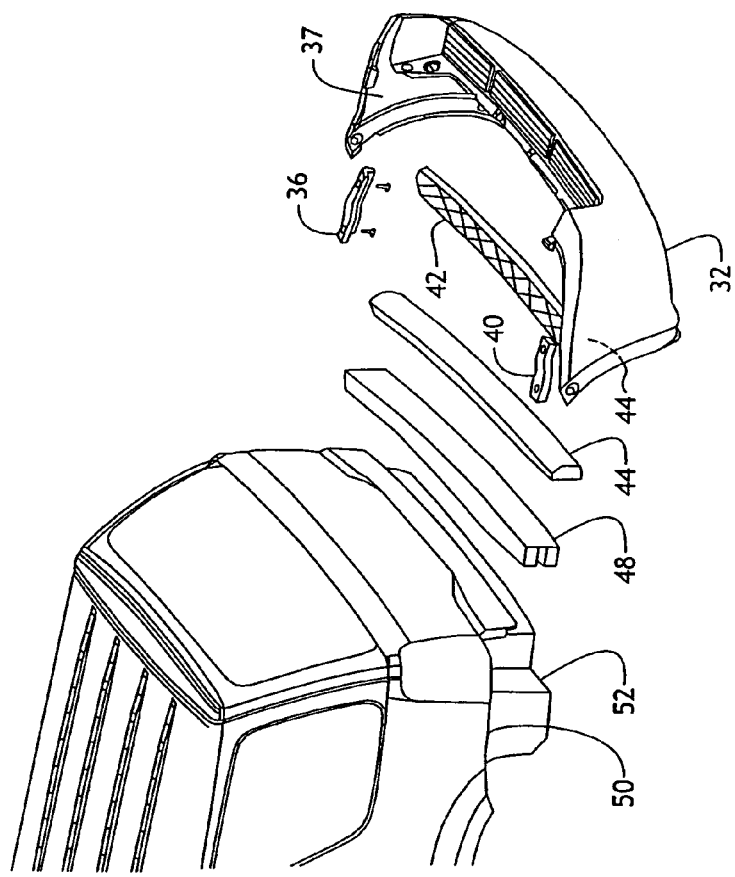
FIG. 2 is a isometric view of a prior art rear vehicle bumper.

FIG. 2 depicts an exploded view of a prior art rear vehicle bumper. The rear vehicle bumper is similar to the bumper described in FIGS. 1A and 1B. The rear bumper includes a flexible fascia 32, rigid fender attachment brackets 36 and 40, and an energy absorption structure including a foam cap 44 and a rigid bumper beam 48. Rigid bumper beam 48 is typically made of metal. Fascia step support 42 is attached to the bottom of fascia 42. Similar to the front bumper, the rear bumper components are assembled together to form a working bumper system. The rear body structure 52 is attached to the rigid beam 48 and foam cap covering 44 which is then attached to the flexible fascia 32, through rear fender attachment brackets 36 and 40, to complete the rear bumper system. The rear fender attachment brackets 36 and 40 are located on the upper inside portions 37 and 41 of the fascia 32 and are attached to corresponding connection points 50 (only the connection point 50 on the driver's side is shown in FIG. 2) on the rear body structure 52.

FIG. 3A depicts a bumper according to a preferred embodiment of the invention, including a co-injection molded front flexible fascia 58. The flexible fascia 58 is provided with co-injection molded rigid support portions 62, 66, 70 and 71, as well as fender attachment brackets 74 and 75. Brackets 74 and 75 are formed as part of support portions 70 and 71 during the co-injection manufacture of fascia 58. FIG. 3B depicts an enlarged section "B" of the improved integrated fascia 58 shown in FIG. 3A. The integrated fender attachment bracket 74 is used to secure the fascia 58 to the primary body structure 28 using conventional fasteners (not shown). An identical integrated fender attachment bracket 75 connects the fascia 58 to the opposite side of the vehicle front body structure 28. As with other rigid portions of the improved integrated fascia 58, the integrated fender attachments 74 and 75 may be formed as rigid structural flanges of fiber filled material co-injected during the molding process in a manner that will be explained below.

During assembly, bumper beam 20 is attached to body structure 28, headlamp bulbs 63 are inserted into support portions 62, and the fascia 58 is attached to body structure 28 at connection points 25 and 26 to complete the bumper system.

While bumper beam 20 is shown in FIG. 3A as a separate component from fascia 58, in accordance with the present invention fascia 58 can be molded to include a rigid support portion to substantially function as a bumper beam. In this embodiment, assembly would merely have the steps of inserting headlamp bulbs 63 into support portions 62, and attaching flexible fascia 58 to body structure at connection points 25 and 26 to complete the bumper system.

Figure 3C:
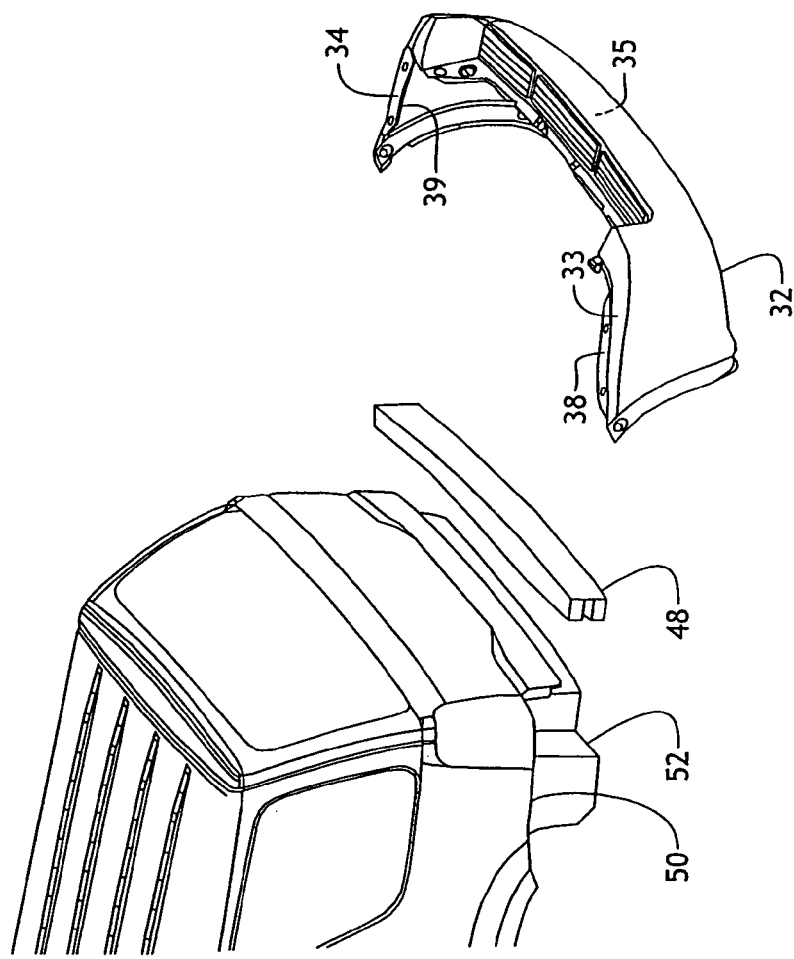
FIG. 3C is a isometric view of a rear vehicle bumper according to a preferred embodiment of the present invention.

FIG. 3C depicts a rear bumper according to a preferred embodiment of the present invention, including a co-injection molded rear flexible fascia 32. The flexible fascia 32 is provided with co-injection molded rigid support portions 33, 34 and 35. The integrated fender attachment brackets 38 and 39 are used to secure the fascia 32 to the rear body structure 52 at connection points 50 (only the connection point 50 on the driver's side is shown in FIG. 2). As with other rigid portions of the improved integrated fascia 32, the integrated fender attachments 38 and 39 may be formed as rigid structural flanges of fiber filled material co-injected during the molding process in a manner that will be explained below.

While rigid bumper beam 48 is shown in FIG. 3C as a separate component from fascia 32, in accordance with the present invention fascia 32 can be molded to include a rigid support portion to substantially function as a bumper beam.

FIG. 4A is a cross-section of a fascia of a prior art fascia 1. Fascia 1 is made throughout from the same flexible material 2. Thus, fascia 1 does not have rigid portions made of or including material that is different from flexible material 2.

Referring to FIG. 4B, the co-injection molded fascia 58 according to a preferred embodiment of the invention may be provided with reinforced rigid portions within its structure in order to increase the impact absorption function of the bumper system. In contrast to FIG. 4A, FIG. 4B depicts a fascia 58 having a cross-section 59 wherein at least two materials 112 and 116 are used to form the fascia. In this embodiment, material 116 is a more rigid material than material 112. The improved integrated bumper fascia 58 is made via co-injection molding of materials 112 and 116 according to the present invention. The improved fascia 58 has a rigid section 60 and a flexible section 60A. Preferably, the rigid material 116 is only injected into certain predetermined portions of the integrated fascia bumper structure 58., e.g., rigid portion 60.

FIGS. 5A and 5B depict a method for molding an vehicle component/bumper fascia 58 according to the invention. Co-injection molding equipment permits the injection of two different plastic materials during the same molding process. Generally, a flexible plastic material 112 is injected into the mold first. Then the rigid plastic material 116 is injected at gates located where the rigid material 116 is desired. The rigid material 116 may or may not be completely contained within the flexible material 112. In certain areas only the flexible material 112 is visible from the outside of the fascia. In a preferred embodiment, the rigid material 116 could be either of a higher stiffness plastic or a fiber reinforced plastic as opposed to flexible material 112. Fiber reinforcements such as glass and carbon greatly increase the strength and rigidity of plastic materials.

In a preferred embodiment of the present invention, the co-injection molding of the improved integrated fascia 58 is a four step process. First, for the flexible portion 60A of the integrated fascia 58, a hot liquid first thermoformable material 112 is injected into the fascia mold 100 and 104 at predetermined gate locations 108. The injected first material 112 will travel into the mold 100, 104 until the mold cavity 105 is filled. As the first material 112 travels in the mold 100, 104, the portion of the first material 112 which travels along the mold walls 100A and 104A will cool and harden faster than the rest of the first material 112.

Rigid sections 60 can now be formed by co-injecting a second material 116 at predetermined gate locations 109. The gate locations 109 will be in the vicinity of the rigid portions 60 to be formed in fascia 58, i.e., where rigid energy absorbing material is required, as previously discussed with respect to FIGS. 3A and 3B. The co-injected second material 116 will be inboard of the first injected material 112 depending on the specific embodiment of the integrated fascia 58.

Figure 9:
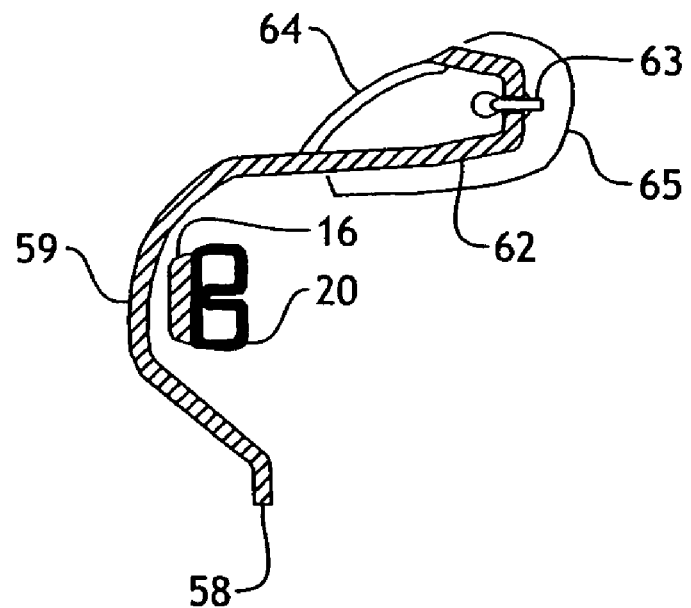
FIG. 9 is a cross-section showing a fascia and an integrated head lamp housing according to another preferred embodiment of the invention.

Thus, the next step, once the first material 112 has been injected, is to co-inject the second material 116 to form the rigid portion 60. A hot liquid second thermoformable material 116 is co-injected at certain predetermined gate locations 109. Predetermined gate locations 109 can be the same as or different from predetermined gate locations 108. The co-injected material will stay inboard of the first material (as shown, for example, in the embodiment in FIG. 4B). When the second material 116 is co-injected, it pushes on the hot center area of the first material 112 since the first material 112 near the mold walls 100A and 104A has cooled and hardened. For internal rigid portions 60 of the integrated fascia 58, the second material 116 will be inside the first material 112. This type of co-injection for internal rigid portions 59, 60, and 62 of the integrated fascia is shown in FIGS. 7–9.

The third step is to co-inject rigid material 116 to form rigid portions that will be both internal and external to the integrated fascia 58. Again, a second thermoformable material 116 is co-injected at certain predetermined gate locations 109. The process of injecting the second material 116 is the same as described above. For the internal/external rigid portions 56 and 61 (shown in FIGS. 7–8) of the integrated fascia 58, the second material 116 will be both inside and outside the first material 112. This type of co-injection for internal/external rigid portions 56 and 61 is shown in FIGS. 7–8. In the fourth step, the first and second materials 112 and 116 in the mold 100 and 104 are allowed to cool and take their final shape.

FIG. 6 depicts a cross-sectional view of a prior art front vehicle bumper fascia 1. The fascia 1 is shown connected to the radiator opening support 24 which is connected to the primary steel body structure 28. Also shown, is the rigid bumper beam 20 with its foam cap covering 16 located behind the fascia 1, and which are separate components that must be attached to fascia 1.

FIG. 7 depicts a cross-section of an assembled bumper structure according to a preferred embodiment of the present invention that incorporates a flexible fascia 58 which includes integrated rigid portions 59 and 60. Rigid portion 60 can serve as a radiator opening support bracket 60 that is integrated into the flexible fascia 58. Similarly, an energy absorption element 61 is integrated into the flexible fascia 58 and cooperates with the rigid bumper beam 20, thereby eliminating the need for the separate foam cap 16 as in the prior art. As will be apparent to those of ordinary skill, the invention provides for the reduction of parts by integrated rigid structures into the flexible fascia.

FIG. 8 depicts a cross-section of a bumper fascia 58 according to another embodiment of the present invention. In this embodiment, the radiator opening support 60, the rigid bumper beam 20, and the foam cap covering 16 (shown in FIG. 6) have all been integrated, through co-injection molding, into the improved fascia bumper 58. Specifically, the upper rigid section 60 functions to provide an attachment area for the bumper fascia 58 to the primary body structure 28 in FIG. 3A. The middle rigid portion 59 is a heavier and stronger structure that replaces both the rigid bumper beam 20 and the foam cap covering 16 in the prior art. In this embodiment, the number of components in the bumper system has again been reduced.

FIG. 9 depicts a cross-section of a bumper fascia according to another embodiment of the present invention. In this embodiment, the headlight lamp structure 62 shown in FIG. 3A if formed via co-injection molding, into the fascia 58, thereby eliminating the need for lamp brackets or lamp housing 12 in the prior art. Specifically, an integrated rigid portion 62 takes the place of the headlight lamp structure 12. The rigid lamp portion 62 section provides structure for accurate aiming of the headlamp light beams. Selective painting or plating can be done after molding to make a reflective parabola surface on the rigid lamp portion 62. The bulb 63 and lens 64 can then be attached. Again, in this embodiment, the number of components in the bumper system has been reduced.

Injection Molding Techniques Utilizing Fluid Channels

In another embodiment, the vehicle component may be manufactured with an additional step of injecting, before the rigid plastic material hardens, a fluid, such as a compressed gas (e.g., air) or pressurized liquid (e.g., water), into the rigid plastic material in the mold to form a fluid channel in the molded article.

Figure 10:
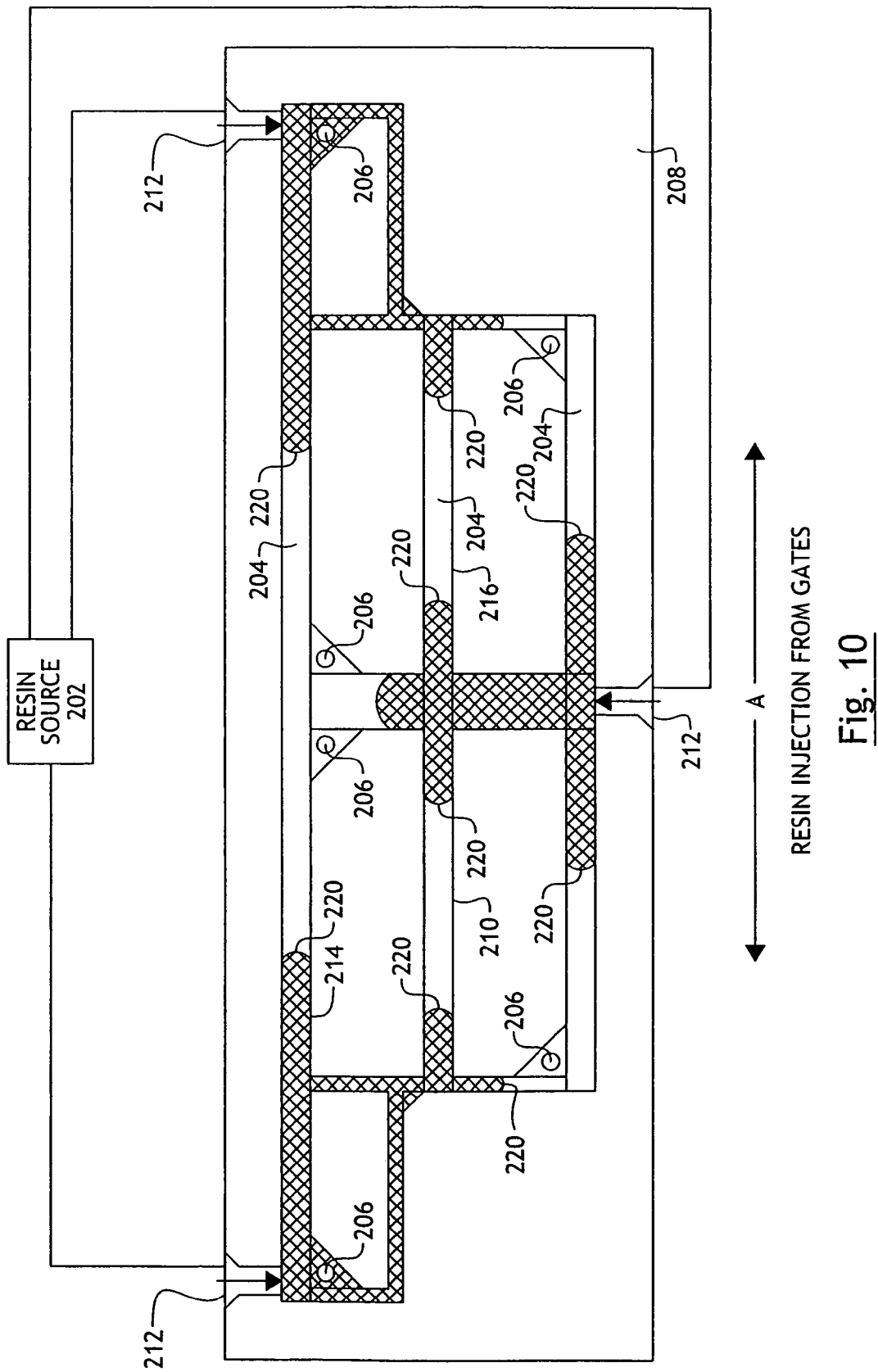
FIG. 10 is an illustration of a section taken along a mold centerline and illustrating a process and apparatus for molding an article according to a preferred embodiment of the invention, showing the introduction of molten resin into the mold.

FIG. 10 is a section taken along a mold centerline so as to reveal the back half of the mold 208 and the back half 210 of the mold cavity 216. The exemplary mold 208 is for a reinforcement member in a vehicle which includes a number of cross-members, associated with cross-member mold cavities 204 of mold cavity 216 which extend in a cross-vehicle direction, i.e., in a direction transverse to the plane of the driver and passenger doors of the vehicle. The reinforcement member made in accordance with the present invention can support a wide variety of components in a vehicle, including but not limited to bumper fascias, battery, grille components, headlamps, radiator, washer fluid reservoir and other components of a vehicle. Generally, in the case of such reinforcement members, it is desirable to provide the greatest structural strength in the cross-vehicle direction, which is generally indicated by the arrow (A). This is because the molded reinforcement member is typically utilized to support a number of components of the vehicle, including the battery, windshield fluid reservoirs, headlights, etc. The reinforcing member is also provided with a number of through holes associated with through hole projections 206 for mounting to the vehicle. It will be recognized by those of ordinary skill that the illustrated reinforcement is merely exemplary and it will be recognized that the invention finds broad application to the molding of many other structural articles.

Mold 208 includes a number of gates 212 for introducing molten resin 214 from a resin source 202 into the mold cavity 216. As can be seen, as molten resin is introduced into the mold through gates 212, a number of flow fronts 220 are formed as the resin streams progress within the mold cavity 216. While multiple gates 212 are shown, a single gate 212 can be sued and still obtain multiple flow fronts 220 as the resin flows through the cavity 216. Typically, the molten resin will comprise reinforcing fibers, such as glass and/or carbon fibers, or reinforcing particles, such as nanoparticles (for example, nanoparticles comprising smectite clay), for increasing the structural strength of the molded article. The resin can be any suitable resin, including but not limited to polypropylene, polyethylene, and/or acrylonitrile butadiene styrene (ABS).

Figure 11A:
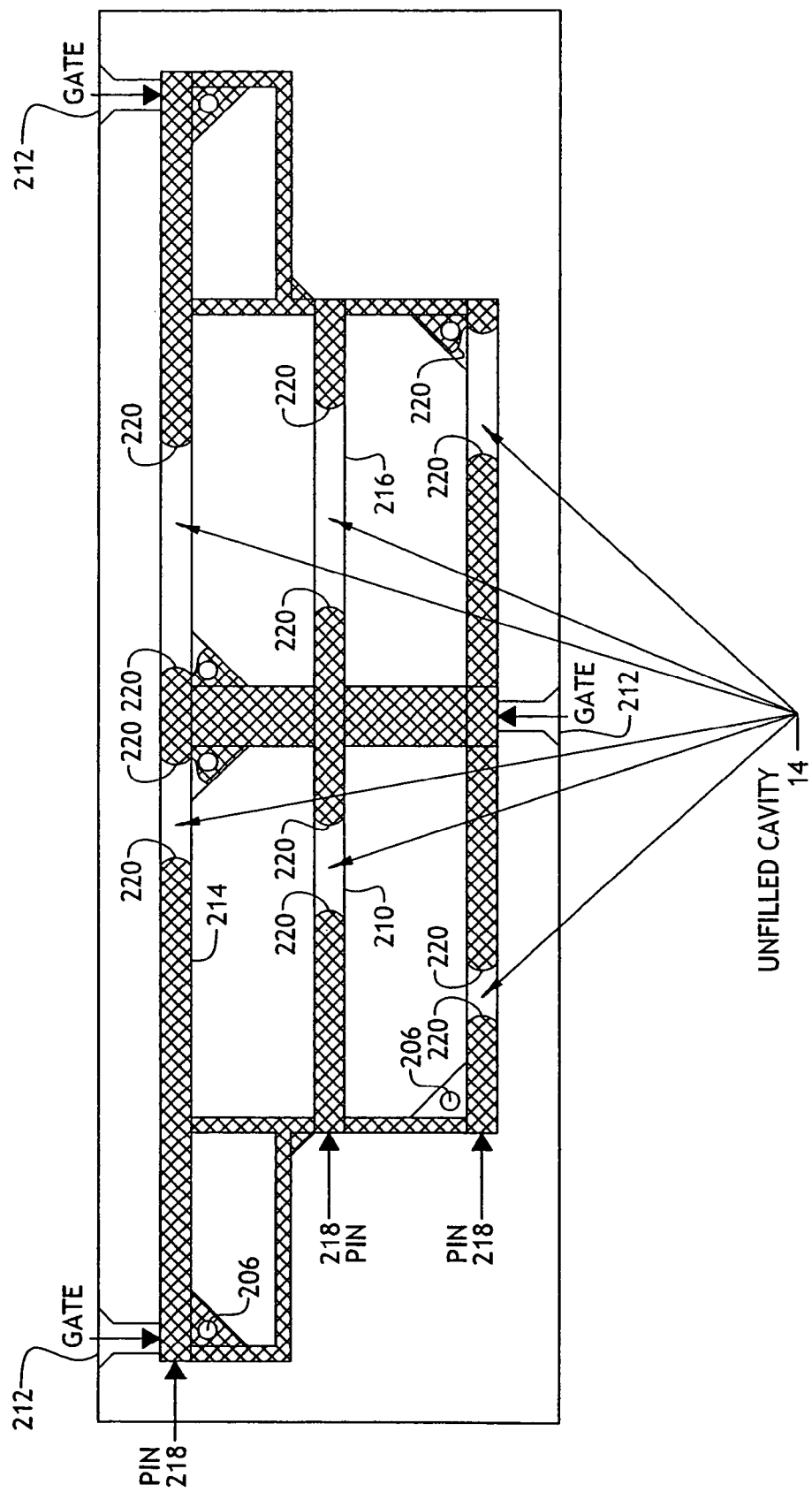
FIG. 11A is an illustration of a section taken along a mold centerline and illustrating a process and apparatus for molding an article according to a preferred embodiment of the invention, that is, a preferred "short shot" method, showing unfilled cavities prior to fluid injection.

FIG. 11A is an illustration of a section taken along a mold centerline and illustrating a process and apparatus for molding an article according to a preferred embodiment of the invention, that is, a preferred "short shot" method, showing unfilled cavities prior to fluid injection. After fluid injection, knit lines (not shown) are formed as the molten resin continues to flow within the mold cavity 216 and the flow fronts 220 collide. As will be recognized by those of ordinary skill, the knit lines represent areas of weakened structural strength in articles molded according to prior art techniques. Thus, the flow rates of the molten resin into the gates 212 and the location of the gates 212 are selected so that knit lines are formed in areas of the molded article which are less likely to be subject to large forces. Further, as shown in FIG. 13, after fluid injection, the knit lines are formed in a first layer 234 of solidified resin, but not in second layer 236 of solidified resin, thereby providing increased strength across knit lines 228.

Figure 11B:
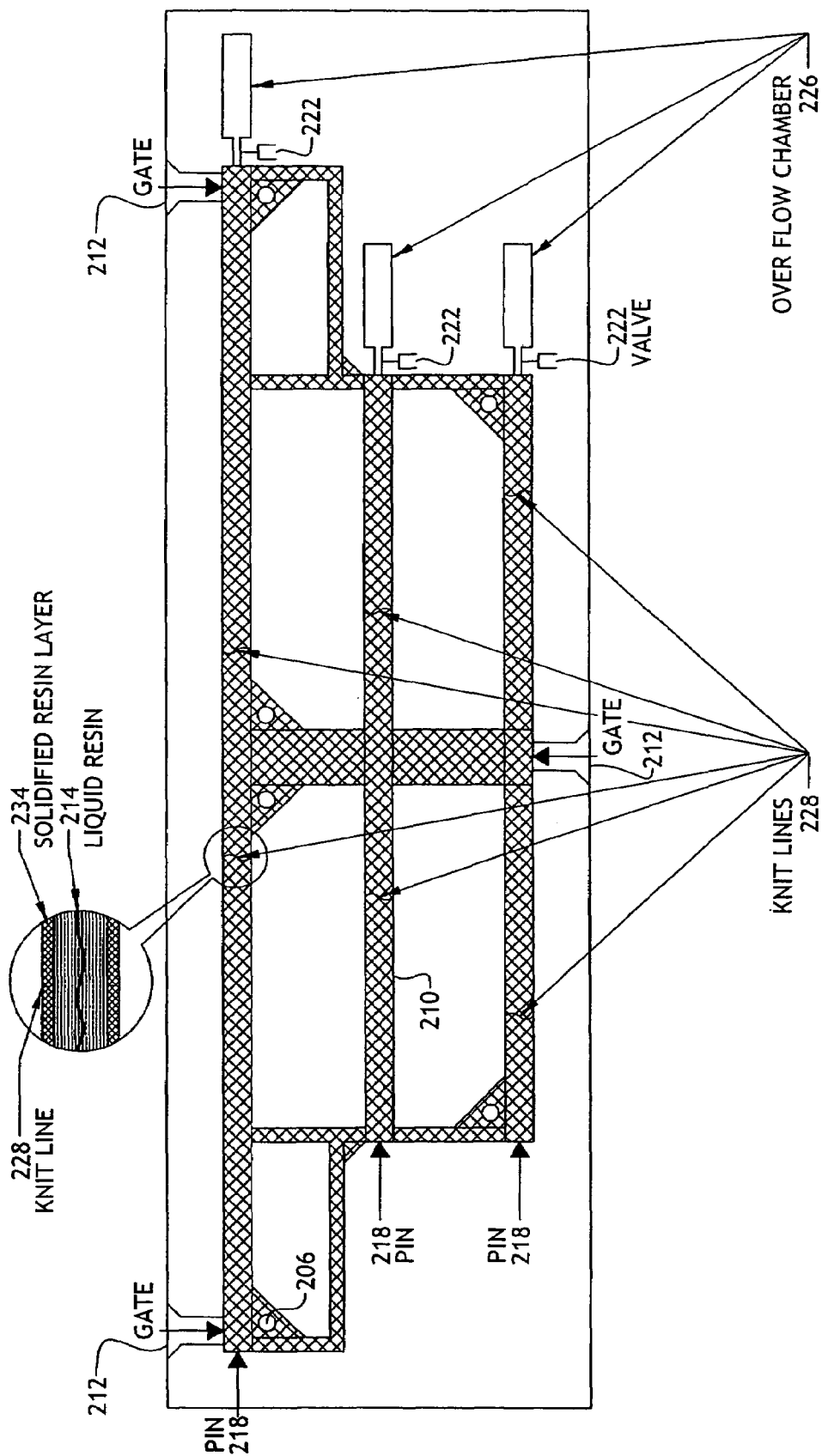
FIG. 11B is an illustration of a section taken along a mold centerline and illustrating a process and apparatus for molding an article according to another preferred embodiment of the invention, that is, a preferred "overflow" method, showing the formation of knit lines in a solidified outerlayer, and no knit lines in a liquid resin inner layer prior to fluid injection.

FIG. 11B is an illustration of a section taken along a mold centerline and illustrating a process and apparatus for molding an article according to another preferred embodiment of the invention, that is, a preferred "overflow" method, showing the formation of knit lines in a solidified outerlayer, and no knit lines in a liquid resin inner layer prior to fluid injection. Further, as shown in FIG. 13, after fluid injection, the knit lines are formed in a first layer 234 of solidified resin, but not in second layer 236 of solidified resin, thereby providing increased strength across knit lines 228.

Figure 12:
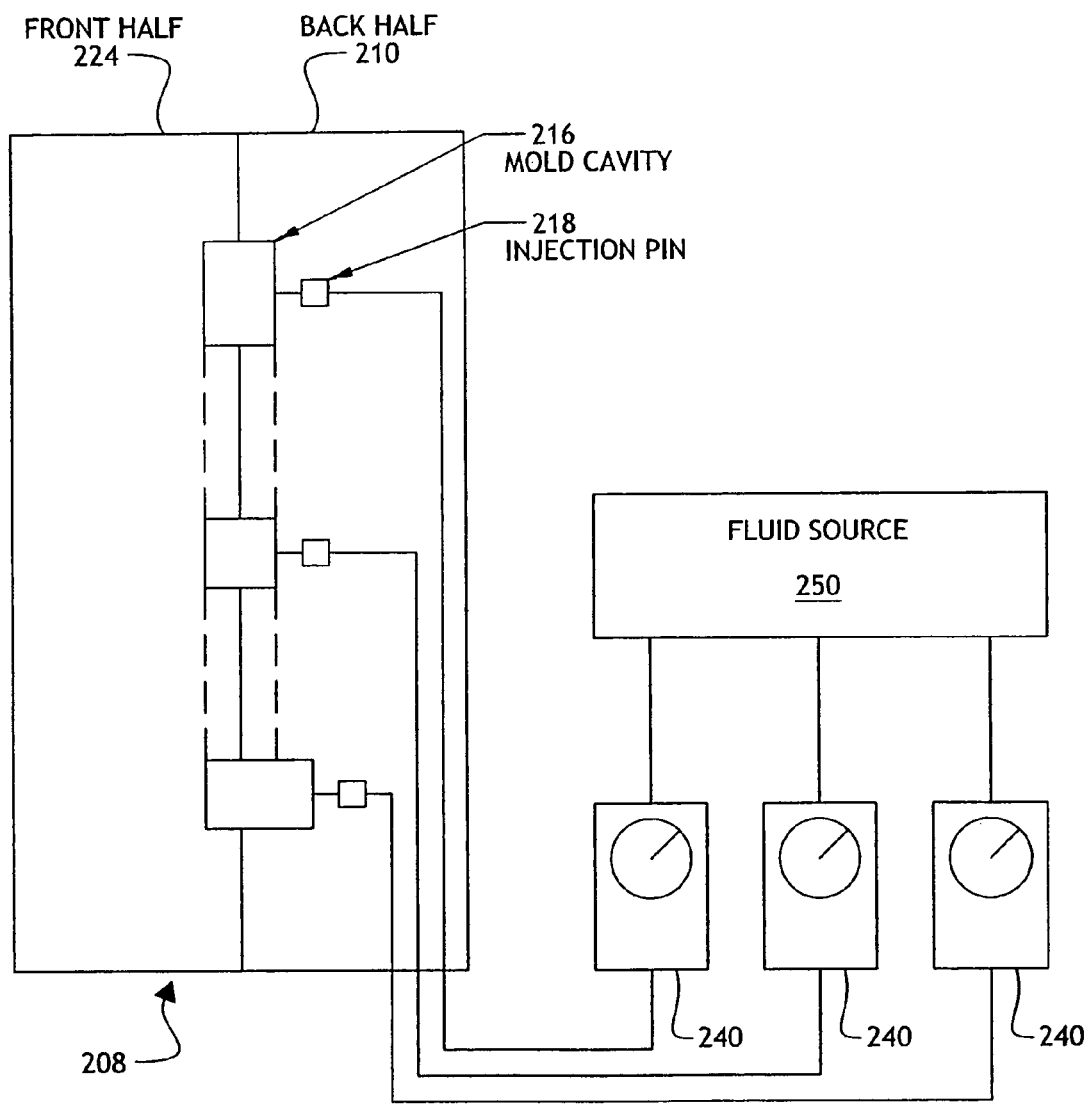
FIG. 12 is an illustration of a section taken along a side view and illustrating a process and apparatus for molding an article according to a preferred embodiment of the invention, showing a fluid injection apparatus for forming of a fluid channel.

FIG. 12 is an illustration of a section taken along a side view and illustrating a process and apparatus for molding an article according to a preferred embodiment of the invention, showing a fluid injection apparatus for forming of at least one fluid channel. The front half 224 and the back half 210 of the mold 208 meet together to form the mold cavity 216. A fluid injection pin(s) 218 permits fluid injection at the appropriate time to form the desired fluid channel 242 as shown in FIG. 13. A fluid injection control unit 240 is coupled to each fluid injection pin 218 and provide control of the fluid from fluid source 250 so that the desired fluid channels 242 are achieved.

Figure 13:
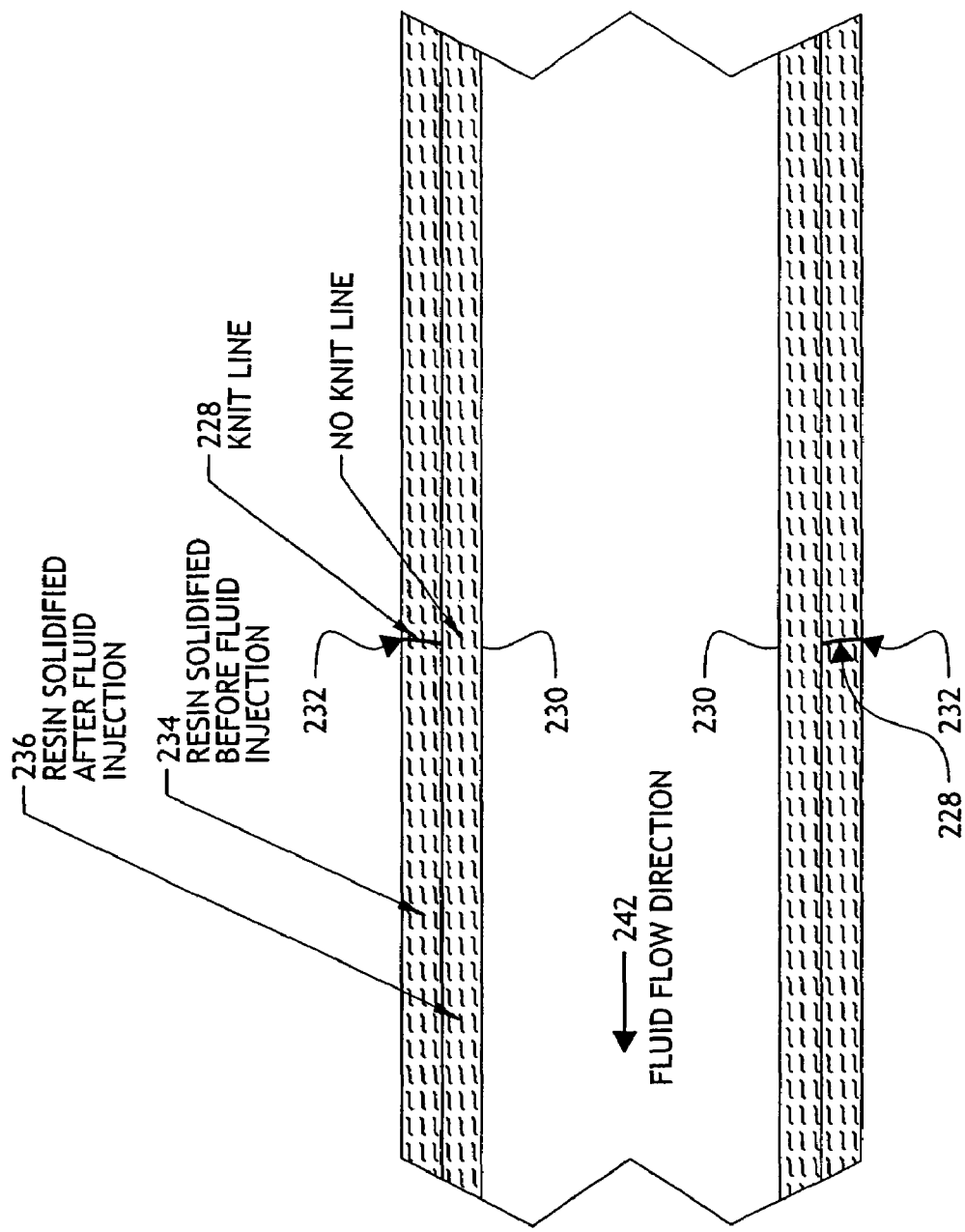
FIG. 13 is a magnified view of a fluid channel 50 formed by the process and apparatus illustrated in FIGS. 10 through 12.

Referring to FIG. 13, in accordance with an aspect of the invention, the molded article is formed with one or more fluid channels 242 extending substantially through the cross-member cavities 204 of the molded structure and across the knit lines 228. As will be appreciated by those of ordinary skill in the art, the fluid channel 242 forms a very strong fiber-reinforced tube within the molded article. Moreover, as illustrated in FIG. 13, the reinforcing fibers 230 extend across the knit lines 228, thereby strengthening the molded article at the knit line interface.

The formation of fluid channels 242 according to the invention, are accomplished by the use of one or more nozzles provided at or near one end of cross member cavities 204, for injecting fluid into the molten resin 214. Such nozzles are preferably of such a diameter or lateral dimension that their presence does not significantly impact the structural strength of the molded article. Moreover, such nozzles may be provided as retractable elements which may be retracted before the entire quantity of resin within the mold is cured, thereby providing for some molten resin to migrate into the hole left by the nozzle.

It will be understood that the injection of fluid should occur at a time that is late enough in the molding process that the peripheral surface of the molten resin has solidified or become semi-solid due to cooling by contact with the mold to form a first layer 234 before fluid injection, yet early enough in the molding process that the center of the resin stream remains in a molten state. Introduction of fluid results in displacement of the molten resin in a generally longitudinal direction and across the knit line to form a second layer 236 of solidified molten resin after fluid injection.

Figure 14:
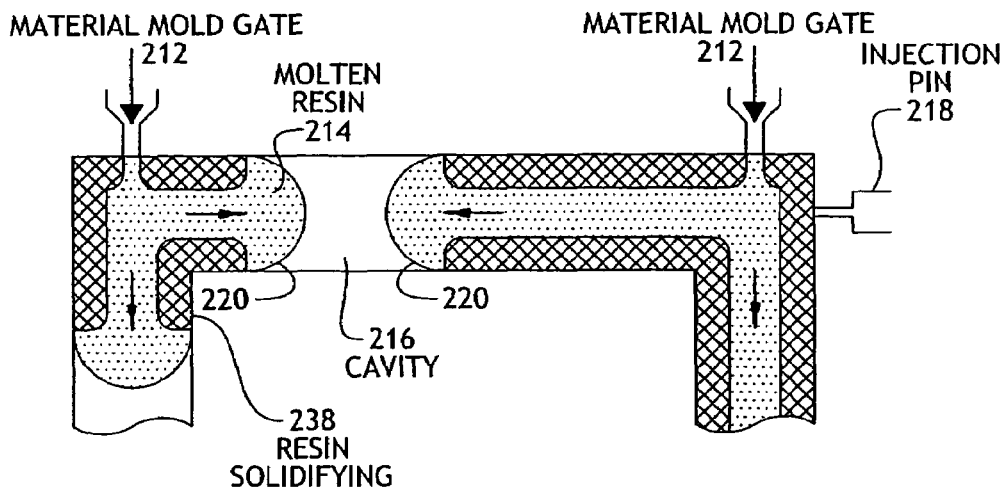
FIGS. 14–16 and 17–19 illustrate a process and apparatus for molding an article using a "packing out" or "short shot" method and an "overflow" method, respectively.
Figure 15:
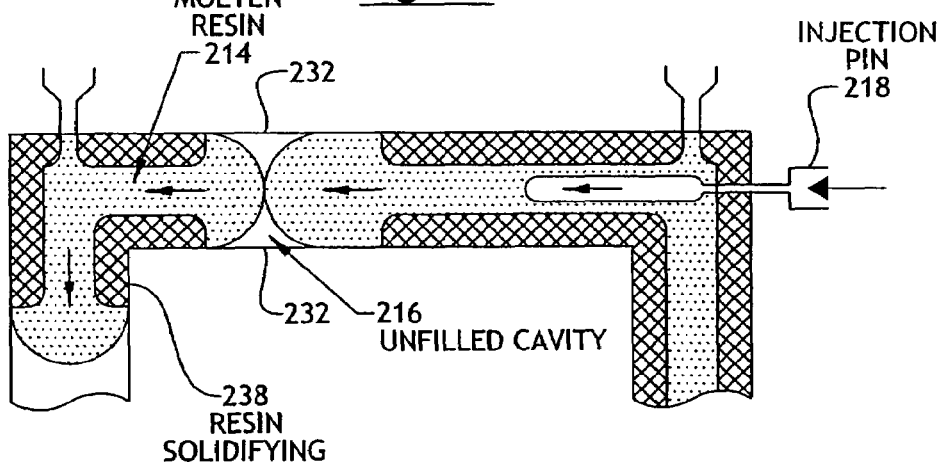

As can be seen in FIG. 13, which is a magnified view of the fluid channel 242 formed by the apparatus and method shown in FIGS. 10–12, the peripheral layer or first layer 234 of solidified resin has solidified with knit line 228. The knit line 228 is a weakened area because the resin began to solidify at the surface of the flow fronts before meeting, resulting in weak fusion. The fibers 230 also do not cross the knit line 228 in first layer 234. During the fluid injection stage, the fluid displaces resin that has not solidified, that is molten resin 214 in central portion 244 (shown in FIGS. 16 and 19), through mold cavity 216. As shown in the embodiment depicted in FIGS. 14–16, during the fluid injection stage the displaced molten resin 214 continues to form a first layer 234 along the mold surface, and to form a second layer 236 inside the peripheral layer or first layer 234 of solidified resin, wherein the second layer 236 is devoid of a knit line. As shown in the embodiment depicted in FIGS. 17–19, during the fluid injection stage, displaced molten resin overflows to an overflow chamber 226, while molten resin remaining the mold cavity forms second layer 236 inside the peripheral layers or first layer 234 of solidified resin, wherein the second layer 236 is devoid of a knit line. The invention therefore provides for increased strength in the vicinity of the knit lines 228 in the first layer 234 of solidified resin.

Figure 16:
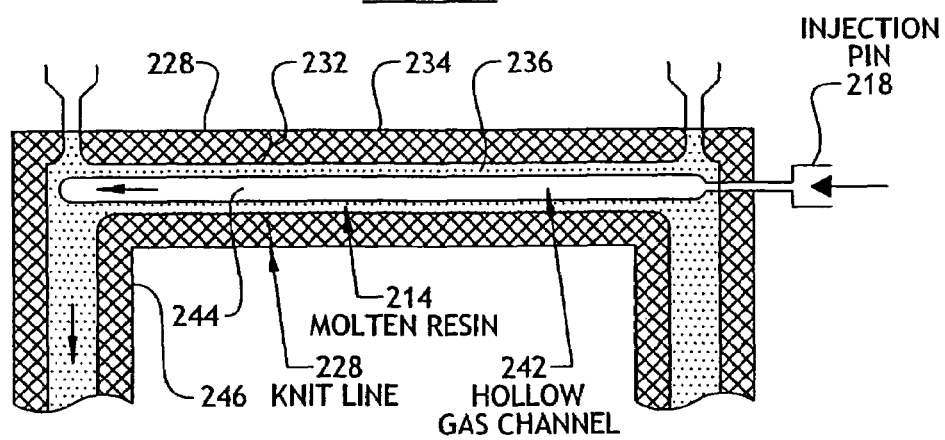
Figure 17:
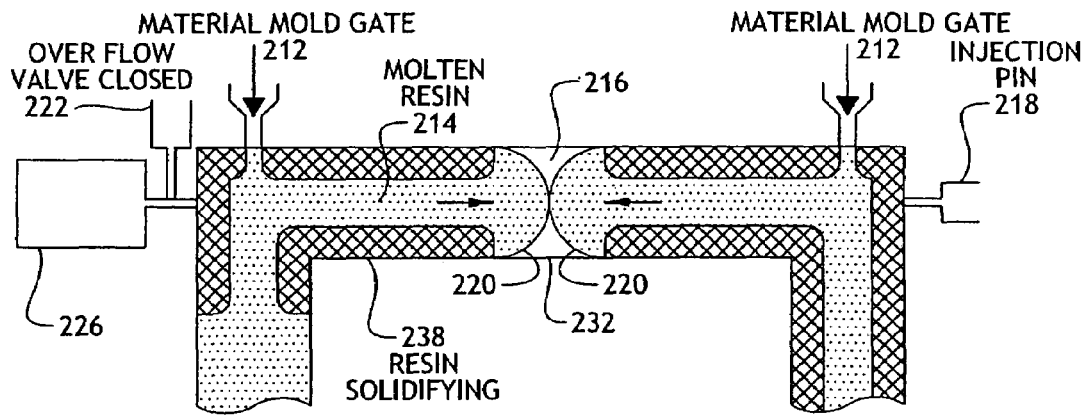
Figure 18:
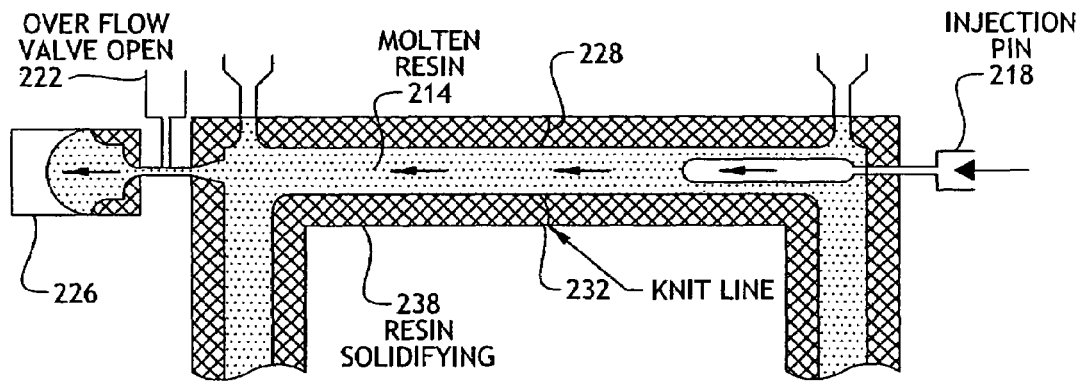

Injection of fluid to form a fluid channel in the mold may be accomplished according to a "short shot" or "packing out" method as shown in FIGS. 11A and 14–16, or alternatively, according to an "overflow method" as shown in FIGS. 11B and 17–19. In the "packing out" method illustrated in FIGS. 14–16, as the molten resin 214 flows from the material mold gate 212, portions 238 of the resin begin to solidify to form first layer 234. As the molten resin 214 continues to flow into the mold cavity, more of the unfilled cavity 216 is filled. As the desired time, fluid is injected via the fluid injection pin 218, forcing the molten resin 214 toward the outside walls of the mold such that a fluid channel 242 is formed in the central portion 244 of the mold cavity 216 and a knit line 228 is formed at a longitudinal point 232 in the mold cavity 216 where the flow front 220 meet. The remaining molten resin 214 then solidifies to form second layer 236 of solidified resin. As shown in FIG. 16, second layer 236 is devoid of a knit line. Part 246, which is formed according to this embodiment, thus has a second layer 236 of solidified resin devoid of a knit line in the vicinity of knit line 228 in first layer 234. Part 246 has increased strength and structural integrity due to the second layer 236 devoid of knit lines in the vicinity of knit line 228 in first layer 234.

Figure 19:
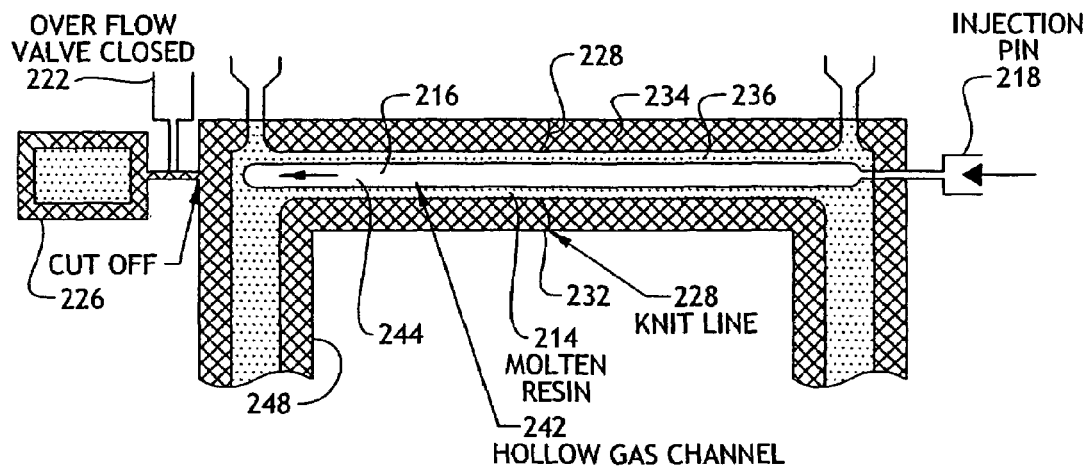

In the "overflow" method shown in FIGS. 11B and 17–19, while the overflow valve 222 is closed, the molten resin 214 is inserted through the material mold gates 212. At a predetermined time when the molten resin has filled a substantial portion of the mold cavity, the overflow valve 222 is opened and fluid is injected via an injection pin(s) 218 to form the desired fluid channel 242 substantially in the central portion of the molded component. The injected fluid displaces some molten resin 214 out of mold cavity 216 through overflow valve 222 and into overflow chamber 226. Upon formation of the desired fluid channel 242, the resin adjacent to the walls of the mold has solidified in first layer 30 and has formed a knit line 228 at longitudinal point 232 in mold cavity 216 where flow fronts 220 meet, and the overflow valve 222 is closed. The remaining molten resin then solidifies to form second layer 236 of solidified resin. As shown in FIG. 19, second layer 236 is devoid of a knit line. Part 248, which is formed according to this embodiment, thus has a second layer 236 of solidified resin devoid of a knit line in the vicinity of knit line 228 in first layer 234. Part 248 has increased strength and structural integrity due to the second layer 236 devoid of knit lines in the vicinity of knit line 228 in first layer 234. If desired, overflow chamber 226 can be grabbed by grabbers (not shown) to remove the part 102 from the mold. Overflow chamber 226 can be removed from part 248 using any suitable method, such as pulling off overflow holder 226 or trimming overflow chamber 226 from part 248.

As previously noted, the fluid can be either a compressed gas or a pressurized liquid. Liquids, such as water, cool and solidify the molten resin faster than a gas, thereby providing for shorter cycle time to form a part. Further, a liquid, such as water, is heavier than a gas, and thus can more easily form a fluid channel in molten resin than a gas. Thus, a liquid can form larger diameter and longer fluid channels in a molten resin than a gas. After the second layer 236 has solidified, the fluid can be retained or expelled from the fluid channel as may be desired.

Co-injection of multiple resin materials at the same or different gates can be used in accordance with the present invention. Thus, if desired, the first layer 234 can comprise a different resin or resin mixture than the second layer 236. In addition, co-injection of multiple resin materials at the same or different times at the same or different gates can be used in accordance with the present invention to obtain first layers 234 comprising a certain resin mixture at certain portions of a part, as well as obtaining second layers 236 comprising a certain resin or resin mixtures at certain portions of a part as may be desired. In addition, the present invention can include sequential valve gating as taught in U.S. Pat. No. 5,762,855, which is incorporated herein by reference.

The fluid(s) used to form the fluid channels in accordance with the present invention can be allowed to exit the fluid channels after the first and second layers of solidified resins have been formed. For example, pressure exerted on a compressed gas used to form a fluid channel can be released. A pressurized liquid can be simply be drained from the fluid channel.

Multi-Part Sequential Valve Gating

Co-injection of multiple resin materials at the same or different gates can be used in accordance with the present invention. In addition, co-injection of multiple resin materials at the same or different times at the same or different gates can be used in accordance with the present invention to obtain a certain resin mixture and/or layers at certain portions of a part or vehicle component. In addition, the present invention can include sequential valve gating as taught in U.S. Pat. No. 5,762,855, which is incorporated herein by reference.

The present invention implements sequential valve gating to mold a plurality of components substantially simultaneously. For example, a plurality of automobile bumper and trim components such as fascias and the like may be produced using the method of the invention. The invention may be implemented using a sequential fill valve gated injection molding system such as a 3500 ton Klockner Windsor press that is modified to provide dual injection and/or co-injection as described below.

The present invention implements a co-coordinated multi-cavity mold system for utilizing a same single injection stroke of an injection molding machine to provide injection molding of a plurality of different component designs, weights and sizes in one molding tool. The molten material is conveyed through the hot sequential valve gated manifold, through multiple valve-pin drops to the respective molding cavities to provide melt fronts that are controlled independently of one another using a mechanical shut-off pin on the valve drop apparatus and opening and closing the valve drop during the injection phase. The drops are regulated by valve-pins that are located within the drops and that reciprocate parallel to the length of the drop. Raising the valve-pin opens the lower end of the drop, allowing molten material to pass through the drop. Lowering the valve-pin closes the opening at the lower end of the drop, stopping the flow of molten material.

The molds themselves (not shown), as is known in the art, typically consist of a cavity portion and a core portion that mate to form a mold cavity and are held together with mold press forces while the molten material is injected into the mold cavity and for a predetermined time thereafter to allow the molded component to solidify. After the predetermined time elapses, the mold is opened, and the molded component is removed.

The opening and closing of the drops may be controlled by the position of the reciprocating screw, which in turn is controlled by a hydraulic motor, that advances the molten material along a channel of the main bore of the injection molding machine. The main bore opens into a channel that distributes the molten material into the multiple valve-pin drops. Alternatively, the opening and closing of the drops may be controlled by a predetermined timing schedule. Generally, the predetermined timing schedule or position settings for the reciprocating screw is preloaded into a microprocessor located in the computerized control system of the injection molding machine. Typically, the operator of the injection molding machine may modify the predetermined timing schedule as needed by inputting the changes into the computerized control system. When the predetermined fill stage has been completed, the drops are controlled independently for the pack and hold phase of the injection molding process.

The gates and drops are balanced so that the molded parts are not over packed. The timing schedule for the microprocessor typically includes the preset times for opening, closing and holding times for each of the valve gates, permitting the valve gates to be operated independently of one another. The times are generally implemented in accordance with the screw position or the timing schedule. Solenoids coupled to the microprocessor may be utilized to control the output to the hydraulic or pneumatic or electric units that operate the valve gates.

Figure 20:
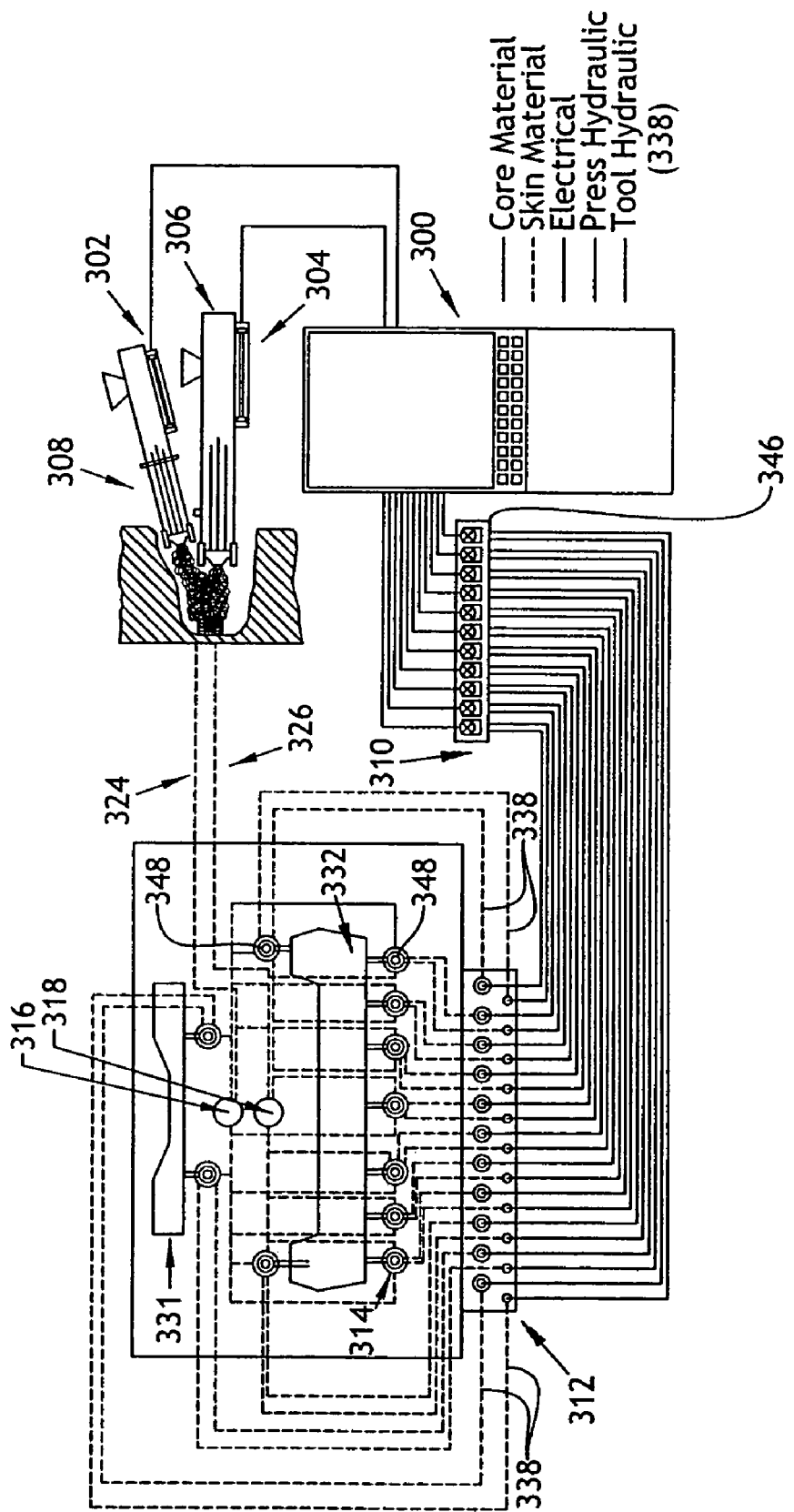
FIG. 20 illustrates one embodiment of a multi-cavity sequential valve gating system in accordance with the present invention.

As shown in FIG. 20, the present invention enables the molder to control the melt fronts of at least two different polymer materials sequentially and independently from one another using a hot runner manifold system. FIG. 20 shows each gate having two drops, each for one of the molten materials, which are activated sequentially in accordance with a computerized programming scheme entered into a microprocessor or controller 300. Each material 324, 326 may be sequenced independently by inputting a predetermined starting point in the controller 300 for each drop unit 314 which can select the point at which the material injects under primary pressure and secondary pressure.

The screw positions on the injection units 306, 308 are monitored by a screw position communication device 302, 304 for each of the injection units 306, 308 independently and provide the communication to a microprocessor or controller 300, which communicates the preselected inputs to a communication device or intermediate control unit 310, which in turn provides output communications to at least one mold communication device 312. The mold communication device 312 communicates each of the individual outputs preselected on the controller 300 via the communication device 310 for each drop unit 314 independently for each melted material 324, 326 which is communicated through independent inlets 316, 318 on the mold to produce a first component 332 with two melted or molten materials 324, 326 where one is a skin and the other is core material.

Clearly, where a first melted material 324 is selected for the skin, a second melted material 326 is selected for the core material, and vice versa.

In one embodiment, a second component 331 may also be produced via the same communication method as mentioned above from either material 324, 326 with each gate/drop being controlled independently in sequence via communication from the mold communication device 312. Also, it is clear that the system may be arranged to provide a plurality of the first described system to control the melt fronts of two different polymer materials sequentially and independently from one another through a hot runner manifold system, e.g., such as the hot runner system at described in U.S. Pat. No. 6,062,840 (which is incorporated herein by reference), so that more than one component may be molded simultaneously.

Typically, opening times, closing times and hold times for each drop unit 314 are entered into a microprocessor or controller 300 of a control system for the mold. The controller 300 is coupled to communication device 310, typically a set of solenoid controls 346 that output control signals to mold communication device 312 that operate the drop units 314. The mold communication device 312 that operates the drop units 314 are typically actuated using hydraulic lines, electronic lines or air lines 338 to valves or cylinders 348 that open and close the drop units 314. Where two molten materials are utilized, there are generally two drop units for each injection point, one for each molten material.

Figure 21:
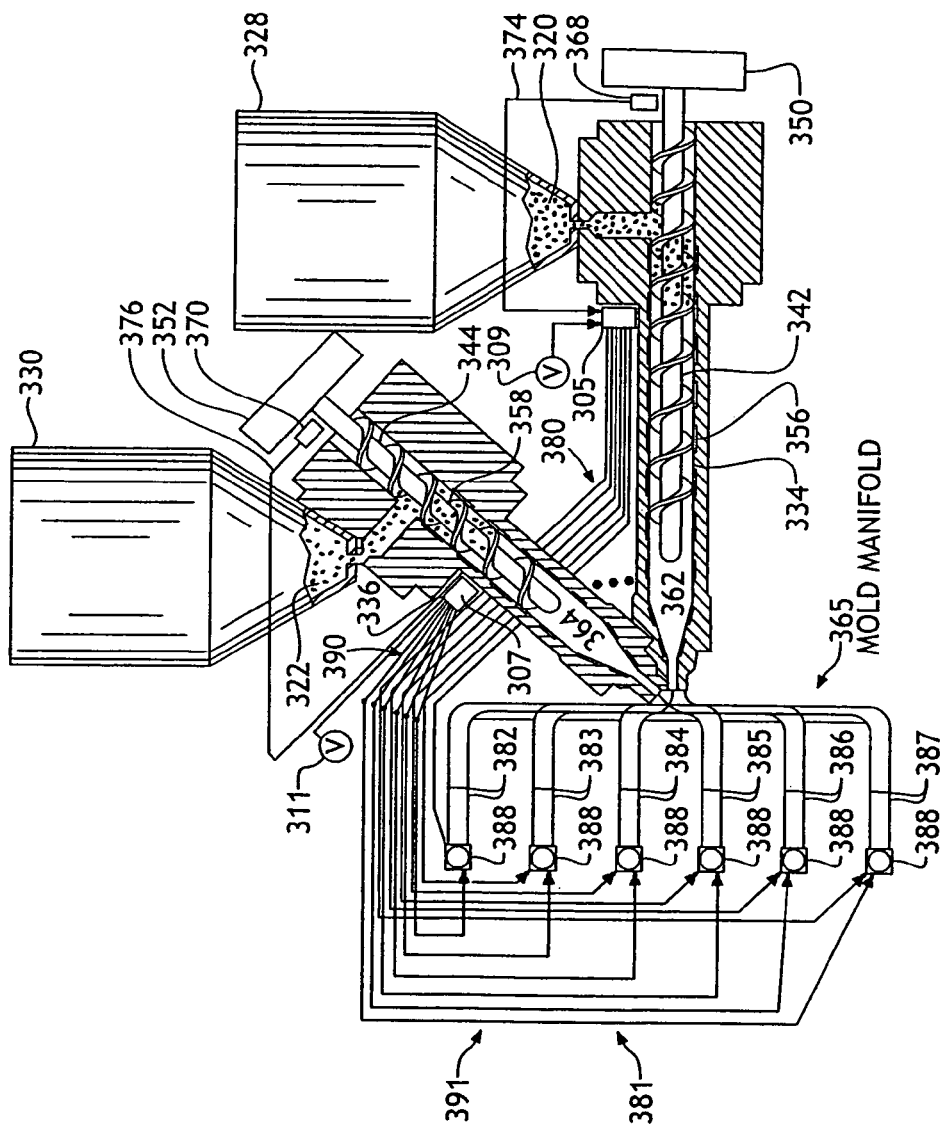
FIG. 21 is an illustration of one embodiment of a multi-cavity sequential valve gating system using at least two reciprocating screws to achieve at least dual injection in accordance with the present invention.

FIG. 21 is an illustration of one embodiment of a multi-cavity sequential valve gating system with at least dual injection. The dual injection may be used to produce different parts using different molds or alternatively, the same parts. An injection molding apparatus with at least two injection units receives plastic pellets 320, 322 that are fed from a bin or hopper 328, 330 into a cylindrical channel 334, 346, where the pellets 320, 322 are transported along the length of the channel 334, 336 using a reciprocating screw 342, 344. Typically, a hydraulic motor 350, 352 rotates the reciprocating screw 342, 344 on its axis. As the pellets are transported along the channel 334, 336, heater bands 356, 358 melt the pellets 320, 322 to form a melt pool 362, 364.

Pressure is applied to the melt pool 362, 364 that is located immediately beyond the end of the reciprocating screw 342, 344, injecting the melt pool through the mold manifold 365 and into the plurality of mold cavities (not shown) using a gating system, for example, as described above for FIG. 1. For example, a hot runner system may be used, for example as described in U.S. Pat. No. 6,062,840. Twelve manifold channels 382–387, in sets of two for a dual injection system, provide for injecting each of two molten materials via each drop unit 388. Each drop unit 388 receives control signals from a controller. Though two controllers 305, 307 are shown, clearly a centralized microprocessor or controller may also be utilized to coordinate injection of melted material by the injection units. The controller or controllers may be programmed to provide through the lines 390, 391 the desired sequencing, valve pin control and the like at the individual valve gates. Control system 380, 381 comprises controllers 305, 307 and lines 390, 391. Typically, the controller is programmed to actuate the valve gates in accordance with the cycle time and position of the screw 342, 344.

A sensor 368, 370 on the screw 342, 344 may be used by the controller to determine the position of the screw 342, 344. In this manner the flow fronts of the melt pool 362, 364 are controlled. The outputs 374, 376 of the sensors 368, 370 are provided to the controllers 305, 307 to monitor the position of the screws 342, 344. A voltage source 309, 311 is provided to operate the controller or controllers. Typically valve pins are utilized, as is known in the art, to sequence injection of melted material from the drop units 388.

Thus, each injection unit can control a select number of valve gates that correspond to a specific cavity. For example, when a first cavity has double the volume of a second cavity, six valve gates, controlled by a first injection unit, may be required to fill the first cavity, and three valve gates, controlled by a second injection unit, may be required fill the second cavity. Pressure can be varied during the process due to different sized parts and geometry, and/or wall stock. If parts are identical, then pressure will vary only slightly during the process.

The multi-cavity sequential valve gating system may utilize co-injection with dual injection. In this embodiment, in at least one mold a first molten material is injected, forming an outer skin, and then a second molten material is injected, forming a core material that pushes against the outer skin. Other molds coupled to the multi-cavity sequential valve gating system may be filled substantially simultaneously using the sequential valve gating process while at least one mold is being filled using the co-injection sequential valve gating process. Generally, the different molten materials are sent down independent channels (as shown in FIG. 21), one for each molten material, where the drop units 388 of each pair are activated to achieve the desired co-injection. A hot runner system may be used, for example as described in U.S. Pat. No. 6,062,840.

Figure 22:
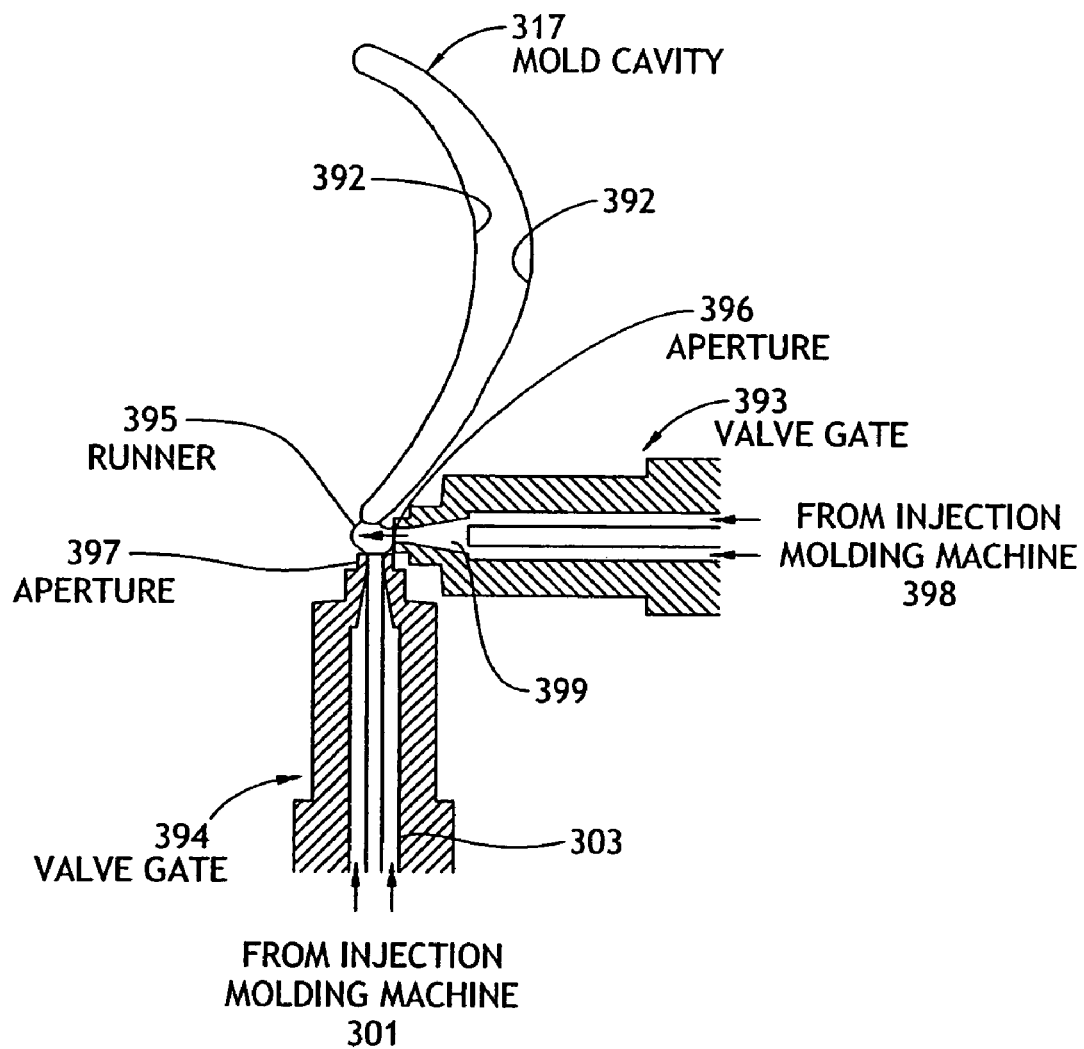
FIG. 22 illustrates an embodiment wherein servo controlled valve gates for sequential valve gating for a mold cavity are distributed along the mold cavity in accordance with the present invention.

FIG. 22 illustrates an embodiment comprising drop units or valve gates 393, 394 for sequential valve gating or servo controlled valve gating for a mold cavity 317. Drop units 393, 394 can comprise any suitable nozzle construction, including but not limited to those described in U.S. Pat. No. 6,062,840. As described more fully above, the valve gates are sequentially activated in accordance with a predetermined scheme that is programmed into a central controller that controls the injection of the melted materials and the valve gate opening and closing. The process is a form of co-injection, utilizing two separate location points for the skin and core materials, respectively.

For example, a first injection molding machine 398 can inject a first molten material 399 that is used as a skin material, and a second injection molding machine 301 can inject a second molten material 303 that is used as a core material. In FIG. 22, first molten material 399 and second molten material 303 can be injected into mold cavity 317 via runner 395. FIG. 22 shows aperture 396 in an open position, and aperture 397 in a closed position, whereupon the first molten material 399 is injected into mold cavity 317 via runner 395. A first part of the first molten material 399 solidifies within mold cavity 317, and a second part or center of the first molten material remains molten. Aperture 397 can then be put in an open position, whereupon the second molten material 303 is injected into mold cavity 317 via runner 395. The second molten material 303 moves both first and second parts of the first molten material 399 towards wall 392 of mold cavity 317, whereupon the first molten material 399 forms the skin material in mold cavity 317. When the second molten material 303 has sufficiently formed the core material in mold cavity 317, aperture 397 can be put into the closed position, and then aperture 396 can be put in the closed position after the mold cavity 317 has been sealed with the first molten material 399.

Low-Density Injection-Molded Body Components

Figure 23A:
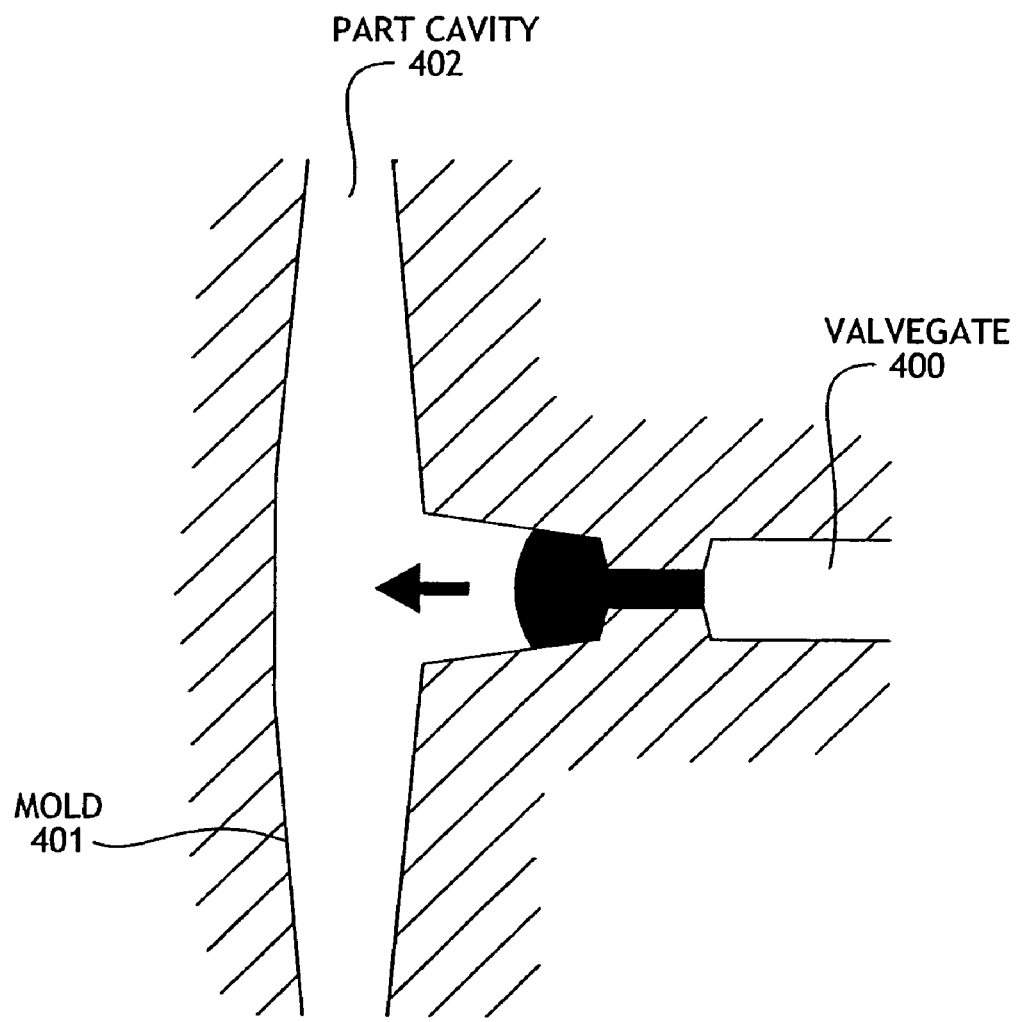
FIGS. 23A and 23B illustrate a beginning of a first injection process and a second injection process, respectively, of the co-injection process in accordance with the present invention.

The co-injection molded, multiphase vehicle component includes an outer portion or phase formed by injection of a preselected thermoplastic material into a preselected mold and a microsphere enhanced inner portion or phase formed by injection of a microsphere enhanced core material. The co-injection is an iterative process performed by injecting the preselected thermoplastic material 404 into a first mold or part cavity, as illustrated in FIG. 23A, in a manner to achieve a first layer or skin 405 of the thermoplastic material 404 in cavity 402 of the mold and permitting the preselected thermoplastic material 404 to form the first layer 405. The microspheres can comprise reinforcing fibers, such as glass, ceramic, carbon and/or rigid organic polymers, or reinforcing particles, such as metals or nanoparticles (for example, nanoparticles comprising smectite clay).

Figure 23B:
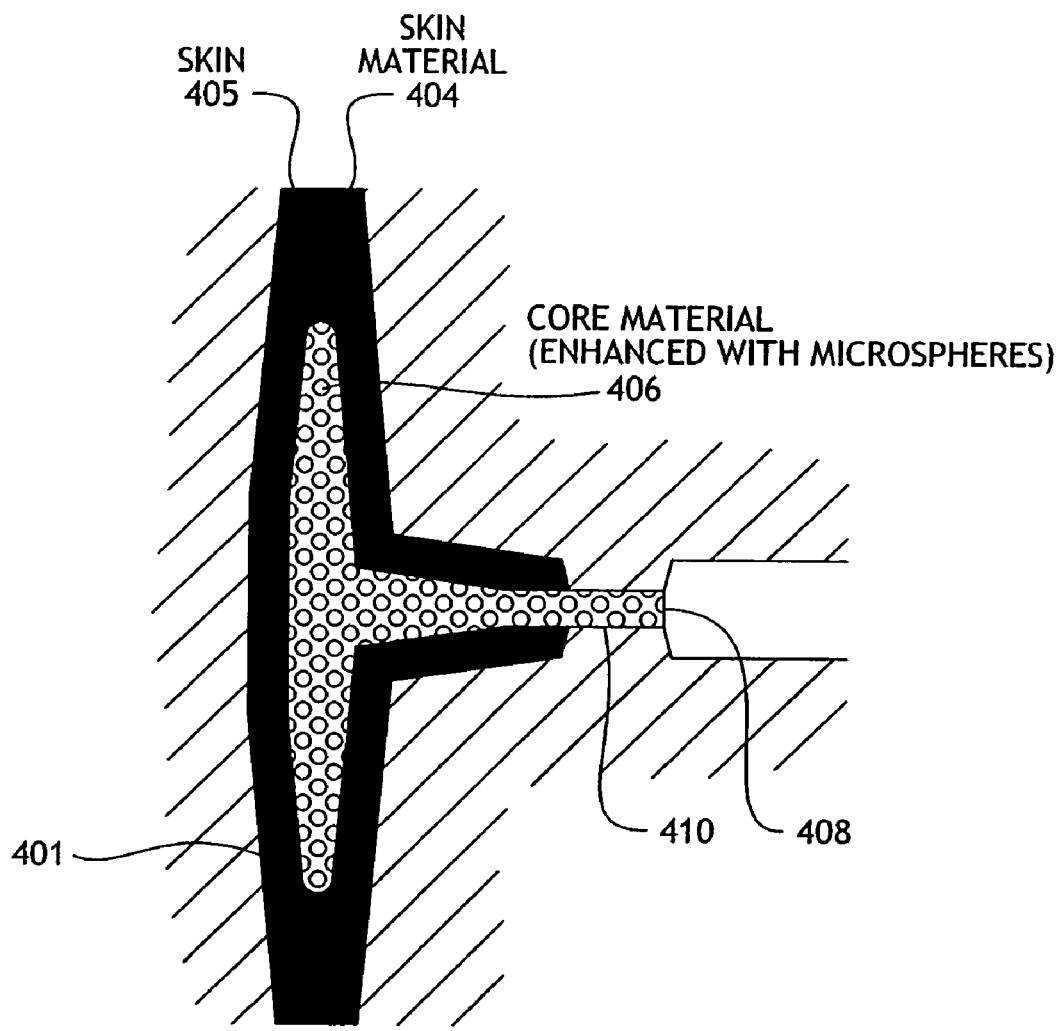

As illustrated in FIG. 23B, after the first layer 405 has been formed, a desired core material 406 that has been enhanced by addition of a preselected volume of microspheres is injected to fill a remaining portion of the mold cavity 402. Where desired, for example, core material may represent ten percent to sixty percent of a cut cross-section of a molded component. Selection of the volume of microspheres to be utilized depends on the desired resultant density and strength of the microsphere enhanced core material. The size of the microspheres is constrained to a size that permits continuance of core thermoplastic material. That is, the diameters of the microspheres are no more than the diameter of the bore of the nozzle 408 inputting the core material 406 and the opening 410 of the mold receiving the core material 406 that has been enhanced by the addition of the microspheres.

Microspheres utilized in the core material may, for example, be tiny glass balls suitable for being processed by an injection-molding machine. For example, microspheres having a diameter between about 1 and 350 μm may be utilized. Where solid microspheres are desired, the microspheres may, for example, consist of glass, carbon, rigid organic polymers, or ceramic. Alternatively, in a preferred embodiment, hollow microspheres may be utilized, thereby further reducing the density of the core. The hollow microspheres do not have to be spherical in shape, but may be any shape that may be processed by an injection-molding machine, wherein, in a preferred embodiment, the microsphere structure is typically substantially hollow and displaces core material. For example, glass microspheres may be prepared by grinding glass to form particles smaller than 1 to 350 μm, then passing the particles through a gas flame that softens the glass and expands the microspheres. Such hollow microspheres may not perfectly spherical, but function to reduce the density of the injected core material and minimize costs by displacing the typically more expensive core material. Also clearly, after the microspheres are exposed to the heating/expansion process, the microspheres may contain some substantially hollow microspheres and some substantially solid microspheres. Thus, the microspheres utilized may be substantially hollow, substantially solid or a mixture of substantially hollow and substantially solid microspheres. Ceramics such as aluminosilicates may be utilizes to provide either solid or hollow microspheres. Microspheres are available commercially, e.g., from the 3M® Company.

Figure 24:
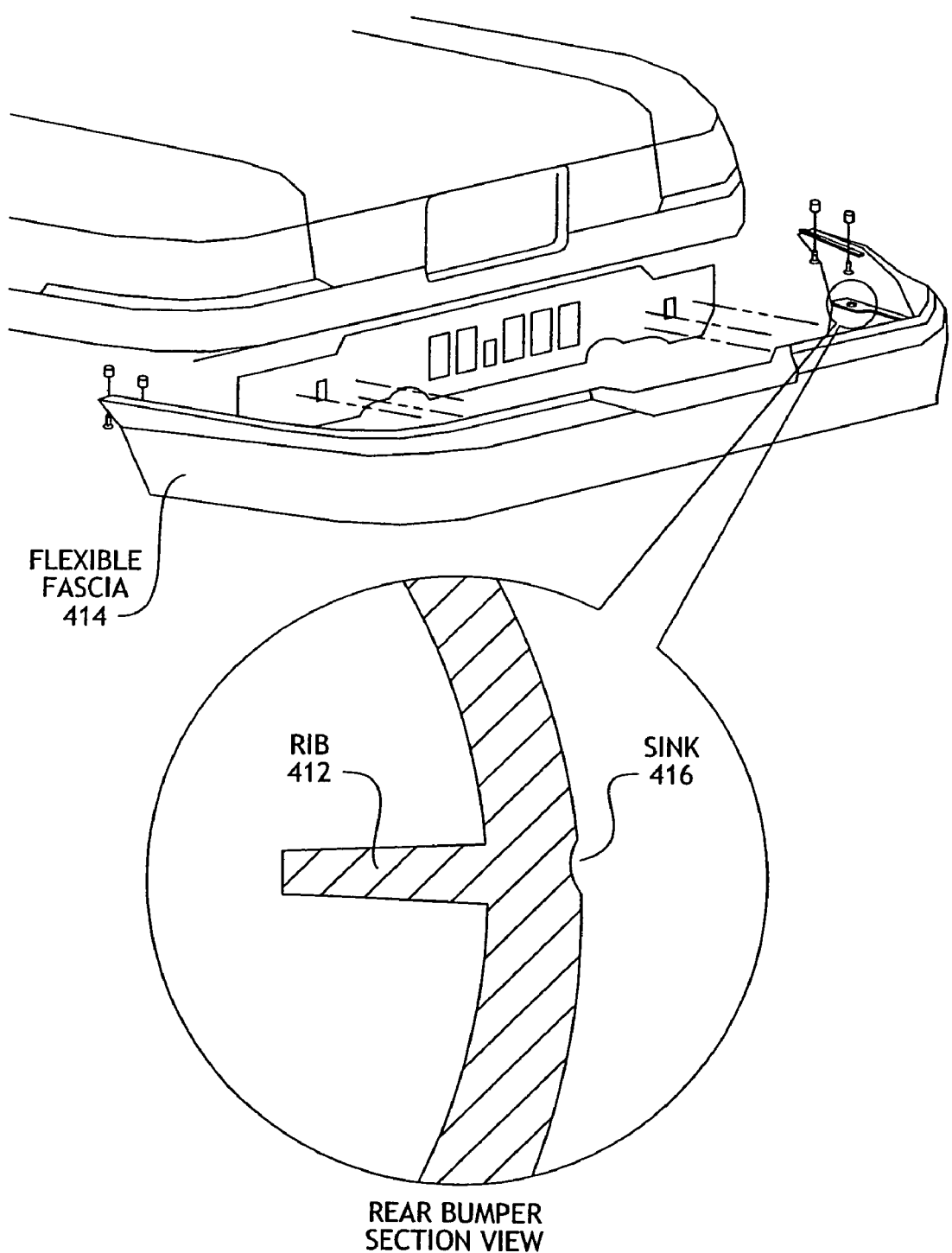
FIG. 24 illustrates a rear bumper perspective view and section view in accordance with the prior art.

FIG. 24 illustrates a rear bumper perspective view and section view in accordance with the prior art. As rib(s) 412 are currently being manufactured, the ribs 412 which are utilized to provide strength to flexible fascia or bumper 414 also typically cause a sink mark 416 to appear on the front of the bumper opposite the rib 412.

Figure 25:
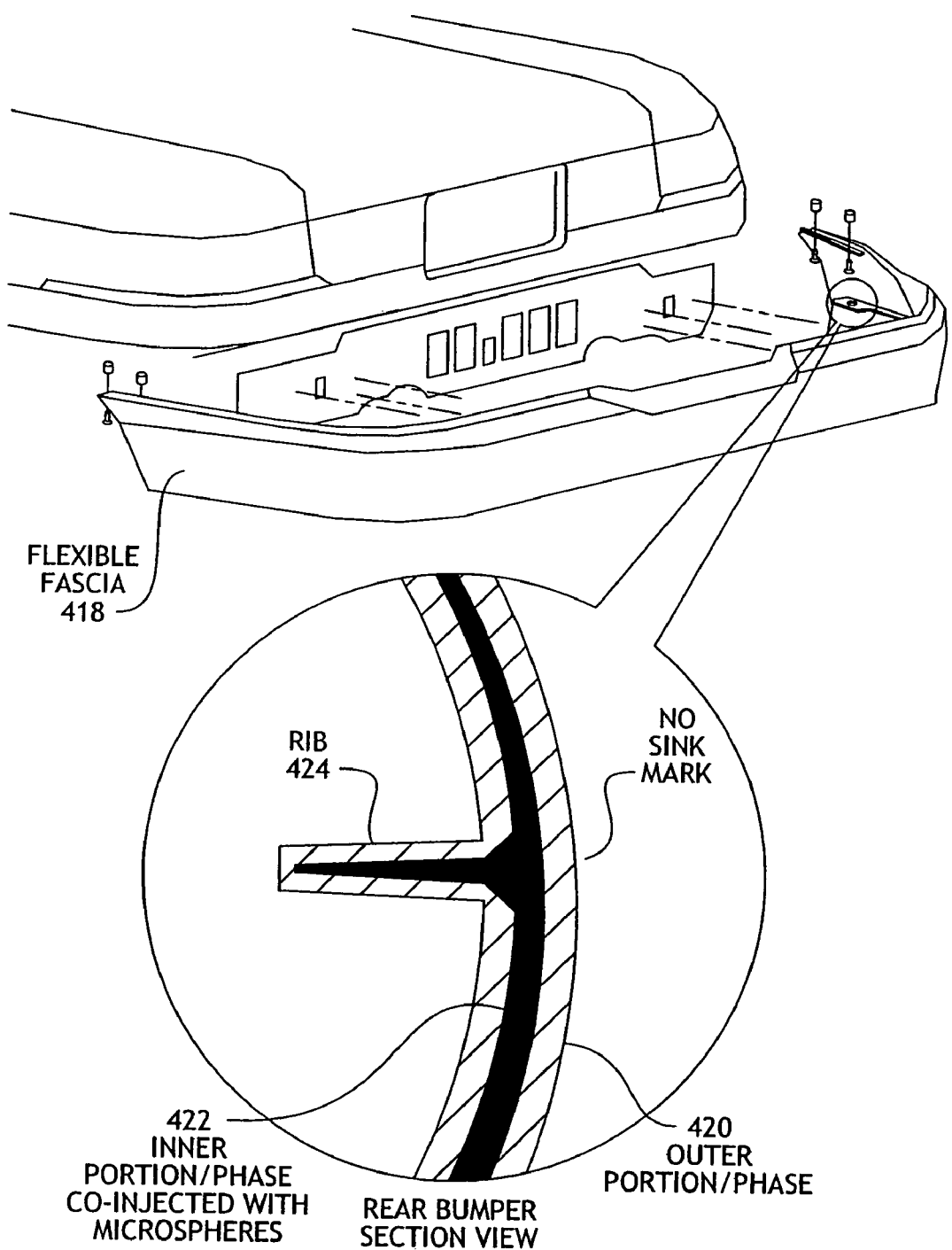
FIG. 25 illustrates a bumper similar to the bumper of FIG. 24, except that the bumper was manufactured as a co-injection molded, multiphase vehicle component in accordance with the present invention.

FIG. 25 illustrates a bumper similar to the bumper of FIG. 24, except that the flexible fascia or bumper 418 is manufactured as a co-injection molded, multiphase vehicle component in accordance with the present invention. The flexible fascia 418 is molded such that the preselected region is molded to achieve an outer portion or phase 420 of thermoplastic material and an inner portion or phase 422 that is co-injected with microspheres, as described more fully below. Ribs 424 may be formed in this manner, providing additional strength without causing sink marks on the surface of flexible fascia 418 opposing the rib 424.

Figure 26:
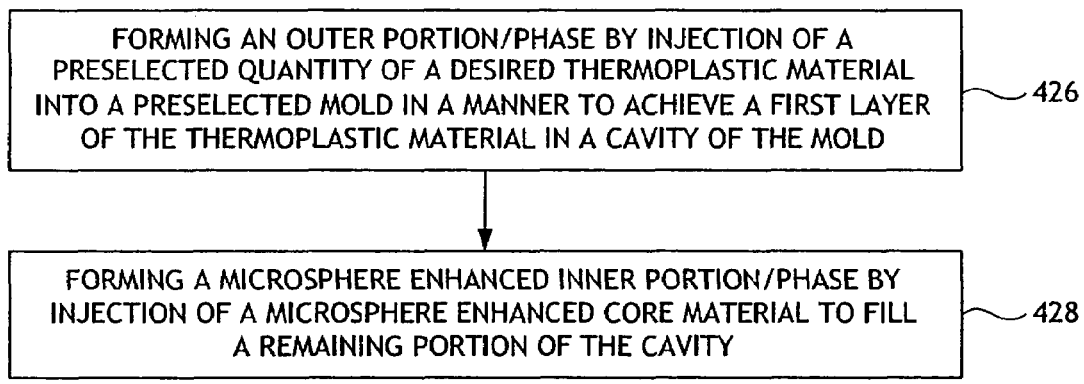
FIG. 26 is a flow chart showing one embodiment of steps of a method in accordance with the present invention.

FIG. 26 is a flow chart showing one embodiment of steps of a method in accordance with the present invention. The method of the present invention provides for molding a multiphase vehicle component with a microsphere enhanced region using co-injection comprising step 426 of forming an outer portion or phase 420 by injection of a preselected quantity of a desired thermoplastic material into a preselected mold in a manner to achieve a first layer of the thermoplastic material in a cavity of the mold; and step 428 of forming a microsphere enhanced inner portion or phase 422 by injection of a microsphere enhanced core material to fill a remaining portion of the cavity. Step 426 of forming an outer portion or phase 420 by injection of a preselected quantity of a desired thermoplastic material into a preselected mold in a manner to achieve a first layer of the thermoplastic material in a cavity of the mold is known to those skilled in the art.

Initiation of the formation of the outer portion/phase is also shown in FIG. 23A. A valve gate 400 in the mold is utilized to inject the thermoplastic material which forms the outer portion/layer, which may be referred to as a "skin", into a part cavity 402. An illustration of step 428 of forming a microsphere enhanced inner portion/phase by injection of a microsphere enhanced core material to fill a remaining portion of the cavity is also shown in FIG. 23B. The "skin" material 404 lines the mold, and the inner portion/phase/core is formed by injecting the core material that is enhanced with microspheres 406 as described more fully above to fill the remaining portion of the cavity 402 of the mold 401.

Typically, the co-injection molded, multiphase vehicle component is a vehicle body panel, a side air dam, a vehicle fender, a fascia or a bumper. Generally, the vehicle body panel is a door panel or a side panel.

The present invention has been described in considerable detail with reference to certain preferred embodiments, however, other versions are possible. Therefore the preferred embodiments discussed are exemplary and the invention is limited only by the following claims and equivalents thereof.

What is claimed is:

1. A vehicle fascia comprising a flexible material forming an outside visible surface, said fascia having a plurality of support portions, at least two of said support portions being configured for attaching said fascia to a vehicle, said support portions comprising said flexible material and an integrated co-injected rigid material, wherein at least two of said support portions comprise a headlight lamp structure having a back wall configured to receive and house a light bulb, the back wall comprising said flexible material and said integrated co-injected rigid material, the back wall integrally formed with the at least two support portions.

2. A vehicle fascia as set forth in claim 1, wherein said rigid material is encased within said flexible material.

3. A vehicle fascia as set forth in claim 2, wherein said rigid material comprises reinforcing fibers or reinforcing particles.

4. A vehicle fascia as set forth in claim 1, wherein the at least two of said support portions are configured to receive and house a lens.

5. A vehicle fascia as set forth in claim 1, wherein one of said support portions is a support rib molded on an inside surface of said fascia without being visible on said outside surface.

6. A vehicle fascia as set forth in claim 5, wherein said one of said support portions has a hollow channel.

7. A vehicle fascia as set forth in claim 6, wherein said co-injected rigid material is devoid of knit lines.

8. A vehicle fascia as set forth in claim 6, wherein said co-injected rigid material is devoid of knit lines in a region where said flexible material has knit lines.

9. A vehicle fascia as set forth in claim 1, wherein said one of said support portions has a hollow channel.

10. A vehicle fascia as set forth in claim 9, wherein said co-injected rigid material is devoid of knit lines.

11. A vehicle fascia as set forth in claim 9, wherein said co-injected rigid material is devoid of knit lines in a region where said flexible material has knit lines.

12. A vehicle fascia as set forth in claim 1, wherein one of said support portions is a support rib.

13. A vehicle fascia as set forth in claim 12, wherein said rigid material includes microspheres.

14. A vehicle fascia as set forth in claim 13, wherein said microspheres are hollow.

15. A vehicle fascia as set forth in claim 1, wherein the headlight structure comprises a reflective surface.

16. A vehicle fascia comprising a flexible material forming an outside visible surface, said fascia having a plurality of support portions, at least two of said support portions being configured for attaching said fascia to a vehicle, said support portions comprising said flexible material and an integrated co-injected rigid material, wherein at least two of said support portions comprise a headlight lamp structure having a back wall configured to receive and house a light bulb and wherein at least one of said support portions comprises a bracket to attach the vehicle fascia to a vehicle body structure, back wall comprising said flexible material and said integrated co-injected rigid material, the back wall integrally formed with the at least two support portions.

17. A vehicle fascia as set forth in claim 16, wherein said rigid material is encased within said flexible material.

18. A vehicle fascia as set forth in claim 17, wherein said rigid material comprises reinforcing fibers or reinforcing particles.

19. A vehicle fascia as set forth in claim 16, wherein the headlight structure comprises a reflective surface.

* * * * *